United States Patent
Ford et al.

(10) Patent No.: US 11,140,190 B2
(45) Date of Patent: Oct. 5, 2021

(54) AUTOMATED USER MODULE ASSESSMENT

(71) Applicant: Forcepoint, LLC, Austin, TX (US)

(72) Inventors: Richard A. Ford, Austin, TX (US); Roman Kleiner, San Diego, CA (US)

(73) Assignee: Forcepoint, LLC, Austin, TX (US)

( * ) Notice: Subject to any disclaimer, the term of this patent is extended or adjusted under 35 U.S.C. 154(b) by 160 days.

(21) Appl. No.: 16/168,299

(22) Filed: Oct. 23, 2018

(65) Prior Publication Data

US 2020/0128035 A1    Apr. 23, 2020

(51) Int. Cl.
*H04L 29/06* (2006.01)
*H04L 29/08* (2006.01)

(52) U.S. Cl.
CPC ...... *H04L 63/1433* (2013.01); *H04L 63/0236* (2013.01); *H04L 63/0485* (2013.01); *H04L 63/1425* (2013.01); *H04L 63/20* (2013.01); *H04L 67/142* (2013.01); *H04L 67/146* (2013.01); *H04L 67/2814* (2013.01)

(58) Field of Classification Search
CPC ..... G06F 21/55–552; G06F 21/56–568; G06F 21/57; G06F 21/577; H04L 63/0236; H04L 63/0281; H04L 63/0485; H04L 63/1408–1425; H04L 63/1433; H04L 63/1441–1491; H04L 63/20–205; H04L 67/142; H04L 67/146; H04L 67/28–2804; H04L 67/2814
See application file for complete search history.

(56) References Cited

U.S. PATENT DOCUMENTS

| | | |
|---|---|---|
| 7,249,369 B2 | 7/2007 | Knouse et al. |
| 7,558,775 B1 | 7/2009 | Panigrahy et al. |
| 7,916,702 B2 | 3/2011 | Hirano et al. |
| 7,941,484 B2 | 5/2011 | Chandler et al. |
| 7,965,830 B2 | 6/2011 | Fleck et al. |
| 8,060,904 B1 | 11/2011 | Evans et al. |
| 8,341,734 B1 | 12/2012 | Hernacki et al. |
| 8,347,392 B2 | 1/2013 | Chess et al. |
| 8,432,914 B2 | 4/2013 | Zinjuwadia et al. |
| 8,463,612 B1 | 6/2013 | Neath et al. |
| 8,695,090 B2 | 4/2014 | Bartle et al. |

(Continued)

OTHER PUBLICATIONS mybluelinux.com, What is email envelope and email header, downloaded Jan. 16, 2020.

(Continued)

*Primary Examiner* — Kevin Bechtel
(74) *Attorney, Agent, or Firm* — Terrile, Cannatti & Chambers; Stephen A. Terrile

(57) ABSTRACT

A method, system and computer-usable medium for automating the assessment of security vulnerabilities associated with a user module via a user module assessment operation. The user assessment operation includes receiving a request from a user module via an edge device; determining whether the request includes a persistent session cookie; determining whether the user module should be assessed to detect security vulnerabilities; resetting information contained in the persistent session cookie when the user module should be accessed to detect security vulnerabilities; redirecting the user module for assessment; and, performing an assessment of the user module to detect possible security vulnerabilities.

20 Claims, 13 Drawing Sheets

(56) References Cited

U.S. PATENT DOCUMENTS

| | | | |
|---|---|---|---|
| 8,856,869 B1* | 10/2014 | Brinskelle | G06F 21/31 |
| | | | 726/2 |
| 9,146,953 B1 | 9/2015 | Hernacki et al. | |
| 9,183,258 B1 | 11/2015 | Taylor et al. | |
| 9,197,601 B2 | 11/2015 | Pasdar | |
| 9,208,316 B1 | 12/2015 | Hill et al. | |
| 9,208,450 B1 | 12/2015 | Nanda et al. | |
| 9,219,752 B2 | 12/2015 | Balinsky et al. | |
| 9,363,164 B2 | 6/2016 | Lemieux | |
| 9,367,872 B1 | 6/2016 | Visbal et al. | |
| 9,374,228 B2 | 6/2016 | Pendarakis et al. | |
| 9,380,523 B1 | 6/2016 | Mijar et al. | |
| 9,419,855 B2 | 8/2016 | Ganichev et al. | |
| 9,465,668 B1 | 10/2016 | Roskind et al. | |
| 9,491,183 B1 | 11/2016 | Dippenaar | |
| 9,525,838 B2 | 12/2016 | Thiyagarajan | |
| 9,826,023 B2 | 11/2017 | Yu | |
| 9,847,910 B2 | 12/2017 | Chung | |
| 10,057,157 B2 | 8/2018 | Goliya et al. | |
| 10,063,419 B2 | 8/2018 | Horstmann et al. | |
| 10,122,632 B2 | 11/2018 | Trossen et al. | |
| 10,142,353 B2 | 11/2018 | Yadav et al. | |
| 10,142,427 B2 | 11/2018 | Li et al. | |
| 10,176,341 B2 | 1/2019 | Spaulding et al. | |
| 10,187,485 B1 | 1/2019 | Shavell et al. | |
| 10,192,074 B2 | 1/2019 | Sarin et al. | |
| 10,205,663 B1 | 2/2019 | Jones et al. | |
| 10,237,175 B2 | 3/2019 | Pignataro et al. | |
| 10,255,445 B1 | 4/2019 | Brinskelle | |
| 10,270,878 B1 | 4/2019 | Uppal et al. | |
| 10,284,578 B2 | 5/2019 | Brugger et al. | |
| 10,284,595 B2 | 5/2019 | Reddy et al. | |
| 10,289,857 B1 | 5/2019 | Brinskelle | |
| 10,291,417 B2 | 5/2019 | Vucina et al. | |
| 10,296,558 B1 | 5/2019 | McInerny | |
| 10,305,776 B2 | 5/2019 | Horn et al. | |
| 10,326,735 B2 | 6/2019 | Jakobsson et al. | |
| 10,331,769 B1 | 6/2019 | Hill et al. | |
| 10,348,639 B2 | 7/2019 | Puchala et al. | |
| 10,349,304 B2 | 7/2019 | Kim et al. | |
| 10,355,973 B2 | 7/2019 | Cicic et al. | |
| 10,439,926 B2 | 10/2019 | Horn et al. | |
| 10,440,503 B2 | 10/2019 | Tapia | |
| 10,498,693 B1 | 12/2019 | Strauss et al. | |
| 10,530,697 B2 | 1/2020 | Fourie et al. | |
| 10,599,462 B2 | 3/2020 | Fried-Gintis et al. | |
| 10,601,787 B2 | 3/2020 | Pritikin et al. | |
| 10,635,512 B2 | 4/2020 | Pepin et al. | |
| 10,652,047 B2 | 5/2020 | Jain et al. | |
| 10,708,125 B1 | 7/2020 | Chen | |
| 2002/0120599 A1 | 8/2002 | Knouse et al. | |
| 2003/0169724 A1 | 9/2003 | Mehta et al. | |
| 2004/0146006 A1 | 7/2004 | Jackson | |
| 2005/0027782 A1 | 2/2005 | Jalan et al. | |
| 2005/0102266 A1 | 5/2005 | Nason et al. | |
| 2005/0105608 A1 | 5/2005 | Coleman et al. | |
| 2005/0207405 A1 | 9/2005 | Dowling | |
| 2005/0273850 A1* | 12/2005 | Freund | H04L 63/0227 |
| | | | 726/14 |
| 2006/0018466 A1 | 1/2006 | Adelstein et al. | |
| 2006/0221967 A1 | 10/2006 | Narayan et al. | |
| 2008/0320556 A1 | 12/2008 | Lee et al. | |
| 2009/0175211 A1 | 7/2009 | Jakobsen | |
| 2009/0241197 A1 | 9/2009 | Troyansky | |
| 2009/0296685 A1 | 12/2009 | O'Shea et al. | |
| 2009/0307600 A1 | 12/2009 | Arthur et al. | |
| 2011/0169844 A1 | 7/2011 | Diard et al. | |
| 2012/0324365 A1 | 12/2012 | Momchilov et al. | |
| 2013/0034097 A1 | 2/2013 | Dharmapurikar et al. | |
| 2013/0091214 A1 | 4/2013 | Kellerman et al. | |
| 2013/0120411 A1 | 5/2013 | Swift et al. | |
| 2013/0340029 A1 | 12/2013 | De Armas et al. | |
| 2014/0032759 A1 | 1/2014 | Barton et al. | |
| 2014/0082726 A1 | 3/2014 | Dreller et al. | |
| 2014/0109174 A1 | 4/2014 | Barton et al. | |
| 2014/0146062 A1 | 5/2014 | Kiel et al. | |
| 2014/0165137 A1 | 6/2014 | Balinsky et al. | |
| 2014/0207850 A1 | 7/2014 | Bestler et al. | |
| 2014/0237594 A1 | 8/2014 | Thakadu et al. | |
| 2014/0280517 A1 | 9/2014 | White et al. | |
| 2014/0379812 A1 | 12/2014 | Bastide, II et al. | |
| 2015/0067832 A1 | 3/2015 | Sastry | |
| 2015/0134730 A1 | 5/2015 | Seedorf et al. | |
| 2015/0220707 A1 | 8/2015 | Kline et al. | |
| 2015/0264035 A1 | 9/2015 | Waterhouse et al. | |
| 2015/0264049 A1 | 9/2015 | Achilles et al. | |
| 2015/0288714 A1 | 10/2015 | Emigh et al. | |
| 2015/0381641 A1 | 12/2015 | Cabrera et al. | |
| 2016/0080397 A1 | 3/2016 | Bacastow et al. | |
| 2016/0094645 A1 | 3/2016 | Ashutosh et al. | |
| 2016/0103992 A1 | 4/2016 | Roundy et al. | |
| 2016/0212012 A1 | 7/2016 | Young et al. | |
| 2016/0352719 A1 | 12/2016 | Yu | |
| 2016/0378409 A1 | 12/2016 | Muramatsu | |
| 2017/0061345 A1 | 3/2017 | Jones, III et al. | |
| 2017/0126587 A1 | 5/2017 | Ranns et al. | |
| 2017/0126718 A1 | 5/2017 | Baradaran et al. | |
| 2017/0134506 A1 | 5/2017 | Rotem et al. | |
| 2017/0237779 A1 | 8/2017 | Seetharaman et al. | |
| 2017/0264628 A1 | 9/2017 | Treat et al. | |
| 2017/0302665 A1 | 10/2017 | Zou et al. | |
| 2018/0012144 A1 | 1/2018 | Ding et al. | |
| 2018/0115613 A1 | 4/2018 | Vajravel et al. | |
| 2018/0152471 A1 | 5/2018 | Jakobsson | |
| 2018/0165463 A1 | 6/2018 | McCreary et al. | |
| 2018/0173453 A1 | 6/2018 | Danilov et al. | |
| 2018/0234368 A1 | 8/2018 | Everton | |
| 2018/0330257 A1 | 11/2018 | Dodson et al. | |
| 2018/0375760 A1 | 12/2018 | Saavedra | |
| 2019/0037029 A1 | 1/2019 | Border | |
| 2019/0057200 A1 | 2/2019 | Sabag et al. | |
| 2019/0075124 A1 | 3/2019 | Kimhi et al. | |
| 2019/0182213 A1 | 6/2019 | Saavedra et al. | |
| 2019/0199745 A1 | 6/2019 | Jakobsson et al. | |
| 2019/0230090 A1 | 7/2019 | Kathiara et al. | |
| 2019/0268381 A1 | 8/2019 | Narayanaswamy et al. | |
| 2019/0278760 A1 | 9/2019 | Smart | |
| 2019/0342313 A1 | 11/2019 | Watkiss et al. | |
| 2019/0354709 A1 | 11/2019 | Brinskelle | |
| 2019/0378102 A1 | 12/2019 | Kohli | |
| 2020/0007548 A1 | 1/2020 | Sanghavi et al. | |
| 2020/0021515 A1 | 1/2020 | Michael et al. | |
| 2020/0021684 A1 | 1/2020 | Kreet et al. | |
| 2020/0153719 A1 | 5/2020 | Chauhan | |
| 2020/0196092 A1 | 6/2020 | Jones | |
| 2020/0213336 A1 | 7/2020 | Yu et al. | |
| 2020/0314002 A1 | 10/2020 | Benoist et al. | |
| 2020/0314004 A1 | 10/2020 | Rashad et al. | |

OTHER PUBLICATIONS

Check Point Software Technologies Ltd., Firewall and SmartDefense, Version NGX R62, 702048, Sep. 25, 2006.
Check Point Software Technologies Ltd., Softwareblades, Firewall R75.40, Administration Guide, Nov. 30, 2014.
Fortinet, FortiOS Handbook—Firewall, version 5.2.0, May 5, 2017.
Wikipedia, IP Address Spoofing, printed Aug. 16, 2017.
David Davis, Techrepublic, Prevent IP Spoofing with the Cisco IOS, Mar. 14, 2007.
Evostream.com, Media Server and Video Streaming Software, https://evostream.com/#, printed Feb. 22, 2018.
Wowza.com, Wowza Streaming Engine, https://www.wowza.com/products/streaming-engine, printed Feb. 22, 2018.
Opencv.org, https://opencv.org/, printed Mar. 6, 2018.
Stackoverflow.com, OpenCV Crop Live Feed from Camera, https://stackoverflow.com/questions/17352420/opencv-crop-live-feed-from-camera, printed Feb. 22, 2018.
Papadopoulos et al., An error control scheme for large-scale multicast applications, Proceedings, IEEE Infocom '98, the Conference on Computer Communications; Mar. 29-Apr. 2, 1998.

(56) References Cited

OTHER PUBLICATIONS

Schmidt et al, AuthoCast: a protocol for mobile multicast sender authentication, Proceeding, MoMM '08 Proceedings of the 6th International Conference on Advanced in Mobile Computing and Multimedia, pp. 142-149, 2008.
Baker F., "Requirements for IP Version 4 Routers," RFC 1812, Jun. 1995. (Year: 1995).
Nichols et al., "Definition of the Differentiated Services Field (DS field) in the IPv4 and IPv6 Headers," RFC 2474, Dec. 1998. (Year: 1998).
Fuller et al., "Classless Inter-Domain Routing (CIDR): The Internet Address Assignment and Aggregation Plan," RFC 4632, Aug. 2006. (Year: 2006).
Hinden, R., "Applicability Statement for the Implementation of Classless Inter-Domain Routing (CIDR)," RFC 1517, Internet Engineering Steering Group, Sep. 1993. (Year: 1993).
Grossman, D., "New Terminology and Clarifications for Diffserv," RFC 3260, Apr. 2002. (Year: 2002).
Arkko J. et al, "IPv4 Address Blocks Reserved for Documentation," RFC 5737, Jan. 2010. (Year: 2010).
Cotton, M. et al., "Special Purpose IP Address Registries," RFC 6890, Apr. 2013. (Year: 2013).
Housley, R. et al., "The Internet Nos. Registry System," RFC 7020, Aug. 2013. (Year: 2013).
Gugelmann, David et al. "Can content-based data loss prevention solutions prevent data leakage in Web traffic?" IEEE Security & Privacy 114 (2015): 52-59, (Year: 2015).
Yoshihama, Sachiko et al., "Web-Based Data Leakage Prevention," IWSEC (Short Papers), 2010 (Year: 2010).

\* cited by examiner

AUTOMATED USER MODULE ASSESSMENT

BACKGROUND OF THE INVENTION

Field of the Invention

The present invention relates in general to the field of computers and similar technologies, and in particular to software utilized in this field. Still more particularly, it relates to a method, system and computer-usable medium for automating the assessment of security vulnerabilities associated with a user module.

Description of the Related Art

Users interact with Internet-based content of all kinds on a daily basis. Each of these interactions poses some degree of security risk. As an example, a user's device may inadvertently become infected by malware embedded in seemingly innocent content provided by what may appear to be a legitimate source. A common approach to addressing this issue is the use of a proxy server, which acts as an intermediary for requests from endpoint devices seeking content from other servers. One known advantage to such an approach is the proxy server can maintain a list of suspicious sites or servers, which can in turn be used to block the user's device from connecting to particular servers. By doing so, the proxy server can prevent potentially malicious content being returned to the user's device.

SUMMARY OF THE INVENTION

A method, system and computer-usable medium for automating the assessment of security vulnerabilities associated with a user module.

More specifically, in one embodiment the invention relates to a method for performing a user module assessment operation, comprising: receiving a request from a user module via an edge device; determining whether the request includes a persistent session cookie; determining whether the user module should be assessed to detect security vulnerabilities; resetting information contained in the persistent session cookie when the user module should be accessed to detect security vulnerabilities; redirecting the user module for assessment; and, performing an assessment of the user module to detect possible security vulnerabilities.

In another embodiment the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: receiving a request from a user module via an edge device; determining whether the request includes a persistent session cookie; determining whether the user module should be assessed to detect security vulnerabilities; resetting information contained in the persistent session cookie when the user module should be accessed to detect security vulnerabilities; redirecting the user module for assessment; and, performing an assessment of the user module to detect possible security vulnerabilities.

In another embodiment the invention relates to a computer-readable storage medium embodying computer program code, the computer program code comprising computer executable instructions configured for: receiving a request from a user module via an edge device; determining whether the request includes a persistent session cookie; determining whether the user module should be assessed to detect security vulnerabilities; resetting information contained in the persistent session cookie when the user module should be accessed to detect security vulnerabilities; redirecting the user module for assessment; and, performing an assessment of the user module to detect possible security vulnerabilities.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
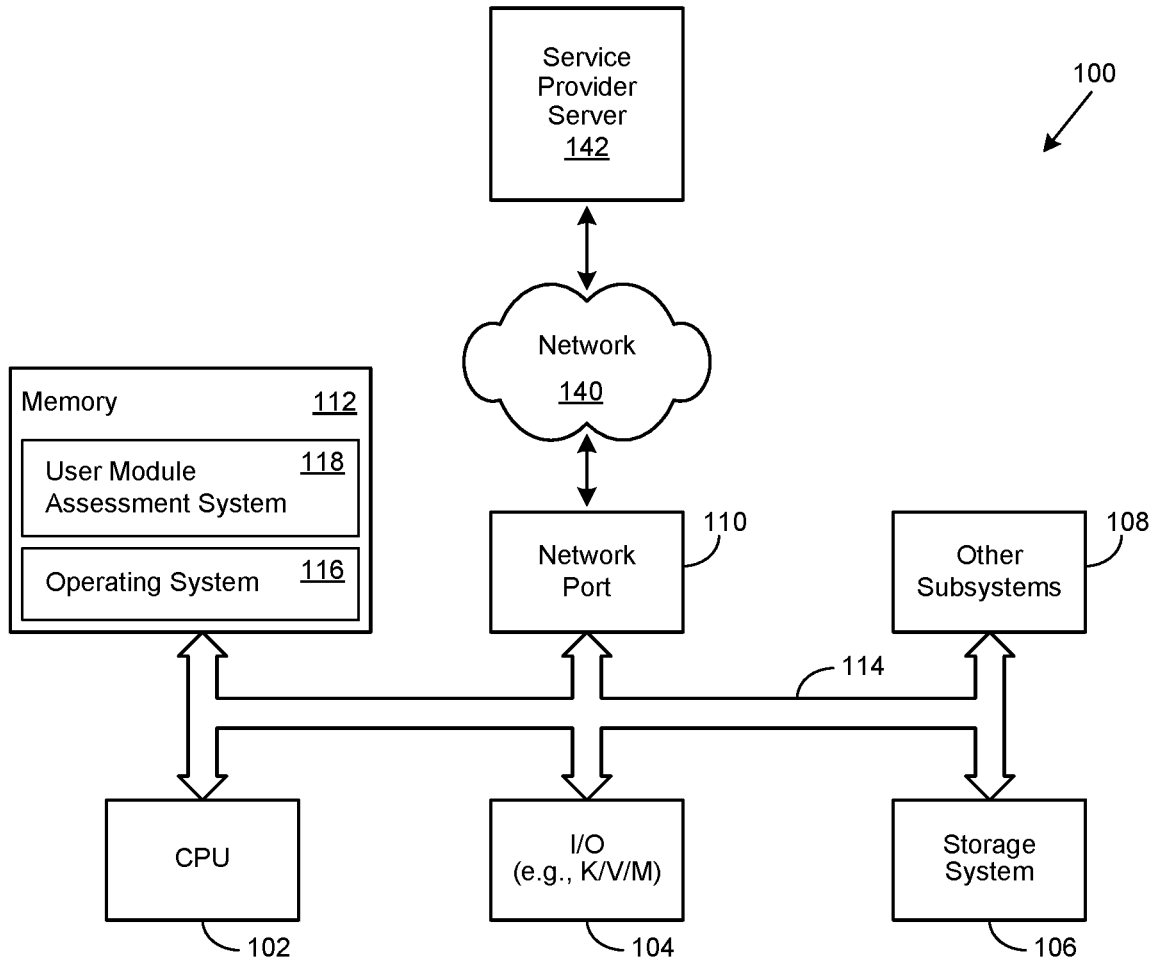
FIG. 1 depicts an exemplary client computer in which the present invention may be implemented.

A method, system and computer-usable medium for automating the assessment of security vulnerabilities associated with a user module. Certain aspects of the present disclosure include an appreciation that certain users may have occasion to use a client device that may not be secure. Accordingly, they may represent a security vulnerability. Certain embodiments of the invention likewise reflect an appreciation that a user of such a client device may desire to place a request to a target server for certain content it may provide.

Certain aspects of the present disclosure include an appreciation that a proxy server, whether implemented as a specialized information handling system or as a software application, acts as an intermediary for requests from client devices seeking resources from other servers. In general, a client device first establishes communication with a proxy server. Once the communication is established, the user may request a particular service, such as a file, connection, web page, or other resource available from a different server. In turn, the proxy server evaluates the request to determine whether it can simplify, manage or constrain its complexity. Once such evaluation is completed, the proxy server forwards the request to a target server.

Certain aspects of the present disclosure include an appreciation that one reason for the development of proxy servers was to add structure and encapsulation to distributed systems. Today, many proxy servers are configured as web proxies, which facilitate access to web-based content by providing anonymity, bypassing IP address blocking, or a combination of the two. Proxy servers can also be used to censor undesirable content through the implementation of a particular type of proxy, commonly referred to as a content filter. Other approaches to such censorship involve the use of a cache-extension protocol such as Internet Content Adaption Protocol (ICAP), which allows plug-in extensions to an open caching architecture.

Certain aspects of the present disclosure include an appreciation that various proxy servers, such as a content filtering proxy, often support user authentication to control web access. Certain aspects of the disclosure include an appreciation that a target server typically sees the egress Internet Protocol (IP) address of the user's browser traffic. Accordingly, the target server can provide content that is localized for the user's location. However, it will likewise be appreciated that the use of a proxy server generally results in a target server seeing the IP address of the proxy server, not the user's browser. As a result, content provided by the target server may be incorrectly localized for the user, as it will likely be localized for the location of the proxy server, which may be in a different location.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a mobile device such as a tablet or smartphone, a consumer electronic device, a connected "smart device," a network appliance, a network storage device, a network gateway device, a server or collection of servers or any other suitable device and may vary in size, shape, performance, functionality, and price. The information handling system may include volatile and/or non-volatile memory, and one or more processing resources such as a central processing unit (CPU) or hardware or software control logic. Additional components of the information handling system may include one or more storage systems, one or more wired or wireless interfaces for communicating with other networked devices, external devices, and various input and output (I/O) devices, such as a keyboard, a mouse, a microphone, speakers, a track pad, a touchscreen and a display device (including a touch sensitive display device). The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or solid state drive), a sequential access storage device (e.g., a tape disk drive), optical storage device, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a storage system 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further includes operating system (OS) 116 and in various embodiments may also include a user module assessment system 118. In one embodiment, the information handling system 100 is able to download the user module assessment system 118 from the service provider server 142. In another embodiment, the user module assessment system 118 is provided as a service from the service provider server 142.

In certain embodiments, the user module assessment system 118 may be preinstalled on the information handling system 100. In certain embodiments, the user module assessment system 118 may be installed on the information handling system 100 on-demand or as needed. In certain embodiments, the user module assessment system 118 may be implemented whenever the information handling system 100 is initiated. In certain embodiments, the user module assessment system 118 may be implemented whenever an associated application, such as a web browser, is initiated.

In various embodiments, implementation of the user module assessment system 118 may include the implementation of certain scripted or coded modules provided by a service provider server 142. In certain embodiments, the scripted or coded modules may be provided and implemented whenever an associated application, such as a web browser, is initiated. In certain embodiments, the scripted or coded modules may be provided and implemented whenever certain classes of content is received by the information handling system 100 for processing.

In various embodiments, the user module assessment system 118 performs a user module assessment operation. In certain embodiments, the user module assessment operation improves processor efficiency, and thus the efficiency of the information handling system 100, by facilitating assessment of security vulnerabilities associated with a user module during operation of the information handling system 100. As will be appreciated, once the information handling system 100 is configured to perform the user module assessment operation, the information handling system 100 becomes a specialized computing device specifically configured to perform the user module assessment operation and is not a general purpose computing device.

Moreover, the implementation of the user module assessment system 118 on the information handling system 100 improves the functionality of the information handling system 100 and provides a useful and concrete of facilitating assessment of security vulnerabilities associated with a user module. In certain embodiments, the user module assessment operation results in automating the assessment of security vulnerabilities associated with a user module.

Figure 2:
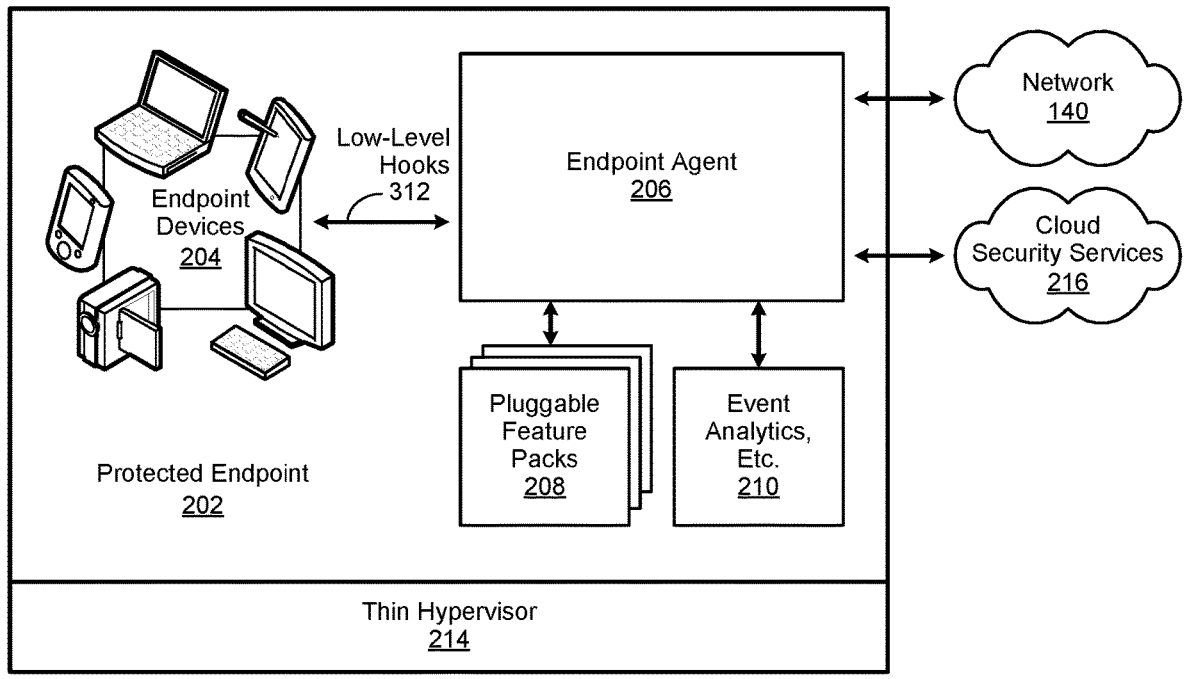
FIG. 2 is a simplified block diagram of an endpoint agent.

FIG. 2 is a simplified block diagram of an endpoint agent implemented in accordance with an embodiment of the invention. As used herein, an endpoint agent 206 broadly refers to a software agent used in combination with an endpoint device 204 to establish a protected endpoint 202. Skilled practitioners of the art will be familiar with software agents, which are computer programs that perform actions on behalf of a user or another program. In various approaches, a software agent may be autonomous or work together with another agent or a user. In certain of these approaches the software agent is implemented to autonomously decide if a particular action is appropriate for a given event, such as an observed user behavior.

An endpoint device 204, as likewise used herein, refers to an information processing system such as a personal computer, a laptop computer, a tablet computer, a personal digital assistant (PDA), a smart phone, a mobile telephone, a digital camera, a video camera, or other device that is capable of storing, processing and communicating data. In certain embodiments, the communication of the data may take place in real-time or near-real-time. As used herein, real-time broadly refers to processing and providing information within a time interval brief enough to not be discernable by a user. As an example, a cellular phone conversation may be used to communicate information in real-time, while an instant message (IM) exchange may be used to communicate information in near real-time. In certain embodiments, the communication of the information may take place asynchronously. For example, an email message may be stored on an endpoint device 204 when it is offline. In this example, the information may be communicated to its intended recipient once the endpoint device 204 gains access to a network 140.

A protected endpoint 202, as likewise used herein, broadly refers to a policy-based approach to network security that typically requires endpoint devices 204 to comply with particular criteria before they are granted access to network resources. As an example, a given endpoint device 204 may be required to have a particular operating system (OS), or version thereof, a Virtual Private Network (VPN) client, anti-virus software with current updates, and so forth. In certain embodiments, the protected endpoint 202 may be implemented to perform operations associated with providing real-time resolution of the identity of an entity at a particular point in time, as described in greater detail herein. In certain embodiments, the protected endpoint 202 may be implemented to provide temporal information, such as time-stamp information, associated with such operations.

In certain embodiments, the real-time resolution of the identity of an entity at a particular point in time may be based upon contextual information associated with a given user behavior. As used herein, contextual information broadly refers to any information, directly or indirectly, individually or in combination, related to a particular user behavior. In certain embodiments, user behavior may include a user's physical behavior, cyber behavior, or a combination thereof. As likewise used herein, physical behavior broadly refers to any user behavior occurring within a physical realm. More particularly, physical behavior may include any action enacted by a user that can be objectively observed, or indirectly inferred, within a physical realm.

As an example, a user may attempt to use an electronic access card to enter a secured building at a certain time. In this example, the use of the access card to enter the building is the action and the reading of the access card makes the user's physical behavior electronically-observable. As another example, a first user may physically transfer a document to a second user, which is captured by a video surveillance system. In this example, the physical transferal of the document from the first user to the second user is the action. Likewise, the video record of the transferal makes the first and second user's physical behavior electronically-observable. As used herein, electronically-observable user behavior broadly refers to any behavior exhibited or enacted by a user that can be electronically observed.

Cyber behavior, as used herein, broadly refers to any behavior occurring in cyberspace, whether enacted by an individual user, a group of users, or a system acting at the behest of an individual user, a group of users, or an entity. More particularly, cyber behavior may include physical, social, or mental actions that can be objectively observed, or indirectly inferred, within cyberspace. As an example, a user may use an endpoint device 204 to access and browse a particular website on the Internet. In this example, the individual actions performed by the user to access and browse the website constitute a cyber behavior. As another example, a user may use an endpoint device 204 to download a data file from a particular system at a particular point in time. In this example, the individual actions performed by the user to download the data file, and associated temporal information, such as a time-stamp associated with the download, constitute a cyber behavior. In these examples, the actions are enacted within cyberspace, in combination with associated temporal information, makes them electronically-observable.

As likewise used herein, cyberspace broadly refers to a network 140 environment capable of supporting communication between two or more entities. In certain embodiments, the entity may be a user, an endpoint device 204, or a resource, such as a system, service, or process. In certain embodiments, the entities may include various endpoint devices 204 or resources operating at the behest of an entity, such as a user or an organization. In certain embodiments, the communication between the entities may include audio, image, video, text, or binary data.

As described in greater detail herein, the contextual information may include a user's authentication factors, familiar to skilled practitioners of the art. Contextual information may likewise include various temporal identity resolution factors, such as identification factors associated with the user, the date/time/frequency of various user behaviors, the user's location, the user's role or position in an organization, their associated access rights, and certain user gestures employed by the user in the enactment of a user behavior. Other contextual information may likewise include various user interactions, whether the interactions are with an endpoint device 204, a network 140, a resource, or another user. In certain embodiments, user behaviors, and their related contextual information, may be collected at particular points of observation, and at particular points in time.

In certain embodiments, the endpoint agent 206 may be implemented to universally support a variety of operating systems, such as Apple Macintosh®, Microsoft Windows®, Linux®, Android® and so forth. In certain embodiments, the endpoint agent 206 may be implemented to interact with the endpoint device 204 through the use of low-level hooks 212 at the OS level. It will be appreciated that the use of low-level hooks 212 allows the endpoint agent 206 to subscribe to multiple events through a single hook. Consequently, multiple functionalities provided by the endpoint agent 206 can share a single data stream, using only those portions of the data stream they may individually need. Accordingly, system efficiency can be improved and operational overhead reduced.

In certain embodiments, the endpoint agent 206 may be implemented to provide a common infrastructure for pluggable feature packs 208. In various embodiments, the pluggable feature packs 208 may provide certain security management functionalities. Examples of such functionalities may include various anti-virus and malware detection, data loss protection (DLP), insider threat detection, and so forth. In certain embodiments, the security management functionalities may include one or more functionalities associated with providing real-time resolution of the identity of an entity at a particular point in time, as described in greater detail herein.

In certain embodiments, a particular pluggable feature pack 208 is invoked as needed by the endpoint agent 206 to provide a given functionality. In certain embodiments, individual features of a particular pluggable feature pack 208 are invoked as needed. It will be appreciated that the ability to invoke individual features of a pluggable feature pack 208, without necessarily invoking all such features, will likely improve the operational efficiency of the endpoint agent 206 while simultaneously reducing operational overhead. Accordingly, the endpoint agent 206 can self-optimize in certain embodiments by using the common infrastructure and invoking only those pluggable components that are applicable or needed for a given user behavior.

In certain embodiments, the individual features of a pluggable feature pack 208 are invoked by the endpoint agent 206 according to the occurrence of a particular user behavior. In certain embodiments, the individual features of a pluggable feature pack 208 are invoked by the endpoint agent 206 according to the occurrence of a particular temporal event, described in greater detail herein. In certain embodiments, the individual features of a pluggable feature pack 208 are invoked by the endpoint agent 206 at a particular point in time. In these embodiments, the method by which a given user behavior, temporal event, or point in time is selected is a matter of design choice.

In certain embodiments, the individual features of a pluggable feature pack 208 may be invoked by the endpoint agent 206 according to the context of a particular user behavior. As an example, the context may be the user enacting the user behavior, their associated risk classification, which resource they may be requesting, the point in time the user behavior is enacted, and so forth. In certain embodiments, the pluggable feature packs 208 may be sourced from various cloud security services 216. In certain embodiments, the pluggable feature packs 208 may be dynamically sourced from various cloud security services 216 by the endpoint agent 206 on an as-need basis.

In certain embodiments, the endpoint agent 206 may be implemented with additional functionalities, such as event analytics 210. In certain embodiments, the event analytics 210 functionality may include analysis of various user behaviors, described in greater detail herein. In certain embodiments, the endpoint agent 206 may be implemented with a thin hypervisor 214, which can be run at Ring −1, thereby providing protection for the endpoint agent 206 in the event of a breach. As used herein, a thin hypervisor broadly refers to a simplified, OS-dependent hypervisor implemented to increase security. As likewise used herein, Ring −1 broadly refers to approaches allowing guest operating systems to run Ring 0 (i.e., kernel) operations without affecting other guests or the host OS. Those of skill in the art will recognize that many such embodiments and examples are possible. Accordingly, the foregoing is not intended to limit the spirit, scope or intent of the invention.

Figure 3:
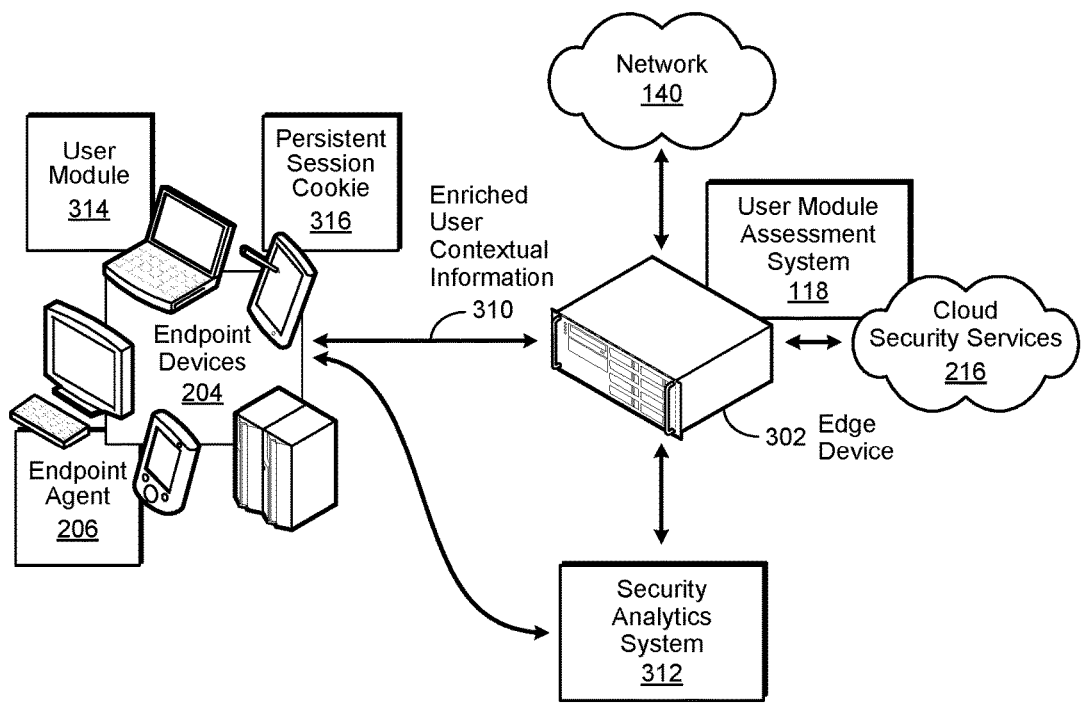
FIG. 3 is a simplified block diagram of the operation of a user module assessment system.

FIG. 3 is a simplified block diagram of the operation of a user module assessment system implemented in accordance with an embodiment of the invention. In certain embodiments, a user module assessment system 118 may be implemented to perform operations related to assessing security vulnerabilities associated with a user module 314, its user, or both. As used herein, a user module 314 broadly refers to a software application capable of communicating information over a network 140. In certain embodiments, the user module 314 may be implemented as a web browser, familiar to skilled practitioners of the art. In certain embodiments, the user module 314 may be implemented as a mobile device application, likewise familiar to those of skill in the art. In certain embodiments, the user module 314 may be implemented on an endpoint device 204.

As used herein, a security vulnerability broadly refers to a weakness which can be exploited by a threat actor to perform unauthorized or undesired actions within a computer system. As likewise used herein, a threat actor broadly refers to an entity that is responsible for an event or incident that impacts, or has the potential to impact, the safety or security of another entity. Likewise, as used herein, an entity broadly refers to something that exists as itself, whether physically or abstractly. In certain embodiments, an entity may be an individual user, a group, an organization, or a government. In certain embodiments, an entity may likewise be an item, a device, such as endpoint 204 and edge 302 devices, a network 140, such as an internal or external network, a domain, an operation, or a process. In certain embodiments, an entity may be a resource, such as a geographical location or formation, a physical facility, a venue, a system, a data store, or a service, such as a service operating in a cloud environment.

Certain aspects of the invention reflect an appreciation that various approaches are known for persistently maintaining information about a browser, its current configuration, its use and interactions during a session, or a combination thereof. One common approach is a cookie, also known as a web cookie, an Internet cookie, or browser cookie, which broadly refers to small piece of data sent from a web site and stored on an endpoint device 204 by the user's web browser while the user is browsing. As typically used, cookies assign an identifier to a visitor of a website in order to recognize them and their associated settings later on. Examples of such settings may include browser type and version, associated information for plug-ins and extensions, user login data, browsing history, contents of a shopping cart, shipping information, and so forth.

Another approach is a supercookie, which contains a unique identifier allowing trackers, such as a website, to link records in their data to track the user's browsing history and behavior. One example of a supercookie is a Flash® cookie, also known as a Local Share Object (LSO), which in contrast to standard cookies, are not browser-dependent and have no expiry date. In typical implementations, supercookies are stored locally and can be removed manually. Evercookies are another known approach and can identify a user even after standard cookies have been deleted from a browser. As typically implemented, evercookies use various approaches to store data in different formats in multiple locations on an endpoint device 204. If cookie data is removed, it is immediately recovered from an alternative storage location. Consequently, evercookies can prove difficult to remove once present on an endpoint device 204.

Yet another approach is fingerprinting, which can be used to identify individual endpoint devices 204 or users and track them across multiple websites, even when cookies are turned off in the browser. As the name implies, a system "fingerprint" of the endpoint device 204 is created, which serves as a unique identifier that allows tracking of a user across multiple browsers installed on the same endpoint device 204. Canvas fingerprinting uses a tracking script to generate a "canvas" image, which is loaded in background and contains a short text. The rendering of the image may vary slightly, depending on the operating system, browser, graphics chip, graphics driver, and fonts installed on the endpoint device 204. These minimal differences are typically sufficient to identify the endpoint device 204, and accordingly, its associated user, when another website using the same tracking method is visited.

Other fingerprinting approaches are also known, and make use of a browser's Application Program Interfaces (APIs) for sound, battery status, or real-time communication (WebRTC). Audio fingerprinting may be implemented to calculate a sound sequence instead of a canvas image, which differs slightly depending on the browser version and system configuration. As before, these differences are sufficient to uniquely identify an endpoint device 204, or its associated user, and recognize them the next time they visit a website. In these approaches, significant volumes of user data can also be obtained using common JavaScript, HTML5, or ECMAScript (ES) functionality.

In certain embodiments, any of these approaches, or a combination thereof, may be used to persistently maintain information about a browser, its current configuration, its use and interactions during a session, or a combination thereof. In certain embodiments, a browser's current configuration and other related information may be stored in a persistent session cookie. As used herein, a persistent session cookie broadly refers to a cookie that combines various aspects of a persistent cookie, and a session cookie, to persistently store information associated with the last interaction between a user module 314, its user, or both, and a user module assessment system 118.

Likewise, as used herein, a persistent cookie broadly refers to a cookie that expires at a particular date, or after a certain period of time, or never at all. In certain embodiments, the date, or period of time, is a matter of design choice. For example, it may be decided that the persistent cookie's expiration may be indeterminate and be used in perpetuity. As likewise used herein a session cookie broadly refers to a cookie that contains certain information related to a session between a user module 314 and a user module assessment system 118, as described in greater detail herein. A session, as likewise used herein, broadly refers to a temporary and interactive interchange of information between two or more communicating devices, such as an endpoint device 204 and an edge device 302, or between a computer and user, for a particular period of time. Those of skill in the art will be familiar with various other approaches, described in greater detail herein, for persistently maintaining session information.

In certain embodiments, the persistent session cookie may be implemented to persist between multiple sessions between the endpoint device 204 and the edge device 302. In certain embodiments, such sessions may include a session between a particular web browser and the edge device 302. As an example, a first and second session may respectively correspond to a session between the edge device 302 and a first and second web browser implemented on the same endpoint device 204. In certain embodiments, a new session may be initiated whenever the user module assessment system 118 interacts with a new user module 314 associated with a particular endpoint device 204.

In certain embodiments, a new session may be initiated if a certain class of content is requested by the user module 314, its configuration is changed during an existing session, or a combination thereof. As an example, the user module 314 may request certain content that requires an extension or add-in to view. Accordingly, the user module 314 may request the corresponding extension or add-in. However, in this example, the requested content, or its corresponding extension or add-on, or both, may have known security vulnerabilities. Accordingly, a new session may be initiated in certain embodiments to assess the user module 314 for security vulnerabilities if the requested content is received by the user module, or its associated extension or add-in is installed, or both.

In certain embodiments, the user module assessment system 118 may be implemented in combination with a security analytics system 312, one or more endpoint agents 206, one or more edge devices 302, various cloud security services 216, and a network 140 to perform such operations. In certain embodiments, the network edge device 302 may be implemented in a bridge, a firewall, or a passive monitoring configuration. In certain embodiments, the edge device 302 may be implemented as a secure web gateway.

As used herein, a secure web gateway broadly refers to various approaches for filtering unwanted software and malware from user-initiated web or Internet traffic and enforces corporate and regulatory policy compliance. In typical implementations, a secure web gateway includes Uniform Resource Locator (URL) filtering, malicious-code detection and filtering, and application controls for popular web-based applications, such as instant messaging (IM) and Skype. In certain embodiments, a secure web gateway may include native or integrated data leak prevention capabilities.

In certain embodiments, the edge device 302 may be implemented as software running on an information processing system. In certain embodiments, the network edge device 302 may be implemented to provide integrated logging, updating and control. In certain embodiments, the edge device 302 may be implemented to receive, or intercept, network requests and context-sensitive cyber behavior information in the form of enriched cyber behavior information 310, described in greater detail herein, from an endpoint agent 206, likewise described in greater detail herein. In certain embodiments, the network edge device 302 may be implemented with a client assessment system 118, described in greater detail herein. In various embodiments, certain functionalities of the client assessment system 118 may be provided to the edge device 302 by one or more cloud security services 216.

In certain embodiments, the security analytics system 312 may be implemented as both a source and a sink of user behavior information. In certain embodiments, the security analytics system 312 may be implemented to serve requests for user/resource risk data. In certain embodiments, the edge device 302 and the endpoint agent 206, individually or in combination, may provide certain user behavior information to the security analytics system 312 using either push or pull approaches familiar to skilled practitioners of the art.

As described in greater detail herein, the edge device 302 may be implemented in certain embodiments to receive, or intercept, enriched user behavior information 310 from the endpoint agent 206. It will be appreciated that such enriched user behavior information 310 will likely not be available for provision to the edge device 302 when an endpoint device 204 is not implemented for a corresponding endpoint agent 206. However, the lack of such enriched user behavior information 310 may be accommodated in various embodiments, albeit with reduced functionality associated with operations associated with providing real-time resolution of the identity of an entity at a particular point in time.

In certain embodiments, a given user behavior may be enriched by an associated endpoint agent 206 attaching contextual information to a request. In certain embodiments, the context is embedded within a network request, which is then provided as enriched user behavior information 310. In certain embodiments, the contextual information may be concatenated, or appended, to a request, which in turn may be provided as enriched user behavior information 310. In these embodiments, the enriched user behavior information 310 may be unpacked upon receipt and parsed to separate the request and its associated contextual information. Those of skill in the art will recognize that one possible disadvantage of such an approach is that it may perturb certain Intrusion Detection System and/or Intrusion Detection Prevention (IDS/IDP) systems implemented on a network 140.

In certain embodiments, new flow requests may be accompanied by a contextual information packet sent to the edge device 302. In these embodiments, the new flow requests may be provided as enriched user behavior information 310. In certain embodiments, the endpoint agent 206 may also send updated contextual information to the edge device 302 once it becomes available. As an example, an endpoint agent 206 may share a list of files that have been read by a current process at any point in time once the information has been collected. To continue the example, such a list of files may be used to determine which data the endpoint agent 206 may be attempting to exfiltrate.

In certain embodiments, point analytics processes executing on the edge device 302 may request a particular service. As an example, risk scores on a per-user basis may be requested. In certain embodiments, the service may be requested from the security analytics system 312. In certain embodiments, the service may be requested from various cloud security services 216.

In certain embodiments, contextual information associated with a user behavior may be attached to various network service requests. In certain embodiments, the request may be wrapped and then handled by proxy. In certain embodiments, a small packet of contextual information associated with a user behavior may be sent with a service request. In certain embodiments, service requests may be related to Domain Name Service (DNS), web browsing activity, email, and so forth, all of which are essentially requests for service by an endpoint device 204. Consequently, such requests can be enriched by the addition of user behavior contextual information (e.g., UserAccount, interactive/automated, data-touched, temporal event information, etc.). Accordingly, the edge device 302 can then use this information to manage the appropriate response to submitted requests.

In certain embodiments, the security analytics system 312 may be implemented in different operational configurations. In certain embodiments, the security analytics system 312 may be implemented by using the endpoint agent 206. In certain embodiments, the security analytics system 312 may be implemented by using endpoint agent 206 in combination with the edge device 302. In certain embodiments, the cloud security services 216 may likewise be implemented for use by the endpoint agent 206, the edge device 302, and the security analytics system 312, individually or in combination. In these embodiments, the security analytics system 312 may be primarily oriented to performing risk assessment operations related to user actions, program actions, data accesses, or a combination thereof. In certain embodiments, program actions may be treated as a proxy for the user.

In certain embodiments, the endpoint agent 206 may be implemented to update the security analytics system 312 with user behavior and associated contextual information, thereby allowing an offload of certain analytics processing overhead. In certain embodiments, this approach allows for longitudinal risk scoring, which assesses risk associated with certain user behavior during a particular interval of time. In certain embodiments, the security analytics system 312 may be implemented to allow the risk-adaptive behavior system to access risk scores associated with the same user account, but accrued on different endpoint devices 204. It will be appreciated that such an approach may prove advantageous when an adversary is moving "sideways" or "horizontally" through a network environment, using different endpoint devices 204 to collect information.

In certain embodiments, the security analytics system 312 may be primarily oriented to applying risk mitigations in a way that maximizes security effort return-on-investment (ROI). In certain embodiments, this approach may be accomplished by providing additional contextual and user behavior information associated with user requests. As an example, a web gateway may not concern itself with why a particular file is being requested by a certain entity at a particular point in time. Accordingly, if the file cannot be identified as malicious or harmless, there is no context available to determine how, or if, to proceed.

To extend the example, the edge device 302 and security analytics system 312 may be coupled such that requests can be contextualized and fitted into a framework that evaluates their associated risk. It will be appreciated that such an embodiment works well with web-based data loss protection (DLP) approaches, as each transfer is no longer examined in isolation, but in the broader context of an identified user's actions, at a particular time, on the network 140. As another example, the security analytics system 312 may be implemented to perform risk scoring processes to decide whether to block or allow unusual flows. It will be appreciated that while various edge device 302 implementations may not stop all such exfiltrations, they may be able to complicate the task for the attacker.

In certain embodiments, the security analytics system 312 may be primarily oriented to maximally leverage contextual information associated with various user behaviors within the system. In certain embodiments, data flow tracking is performed by one or more endpoint agents 206, which allows the quantity and type of information associated with particular hosts to be measured. In turn, this information may be used to determine how the edge device 302 handles requests. By contextualizing such user behavior on the network 140, the risk-adaptive behavior system can provide intelligent protection, making decisions that make sense in the broader context of an organization's activities. It will be appreciated that one advantage to such an approach is that information flowing through an organization, and the networks they employ, should be trackable, and substantial data breaches preventable. Skilled practitioners of the art will recognize that many such embodiments and examples are possible. Accordingly, the foregoing is not intended to limit the spirit, scope or intent of the invention.

Figure 4:
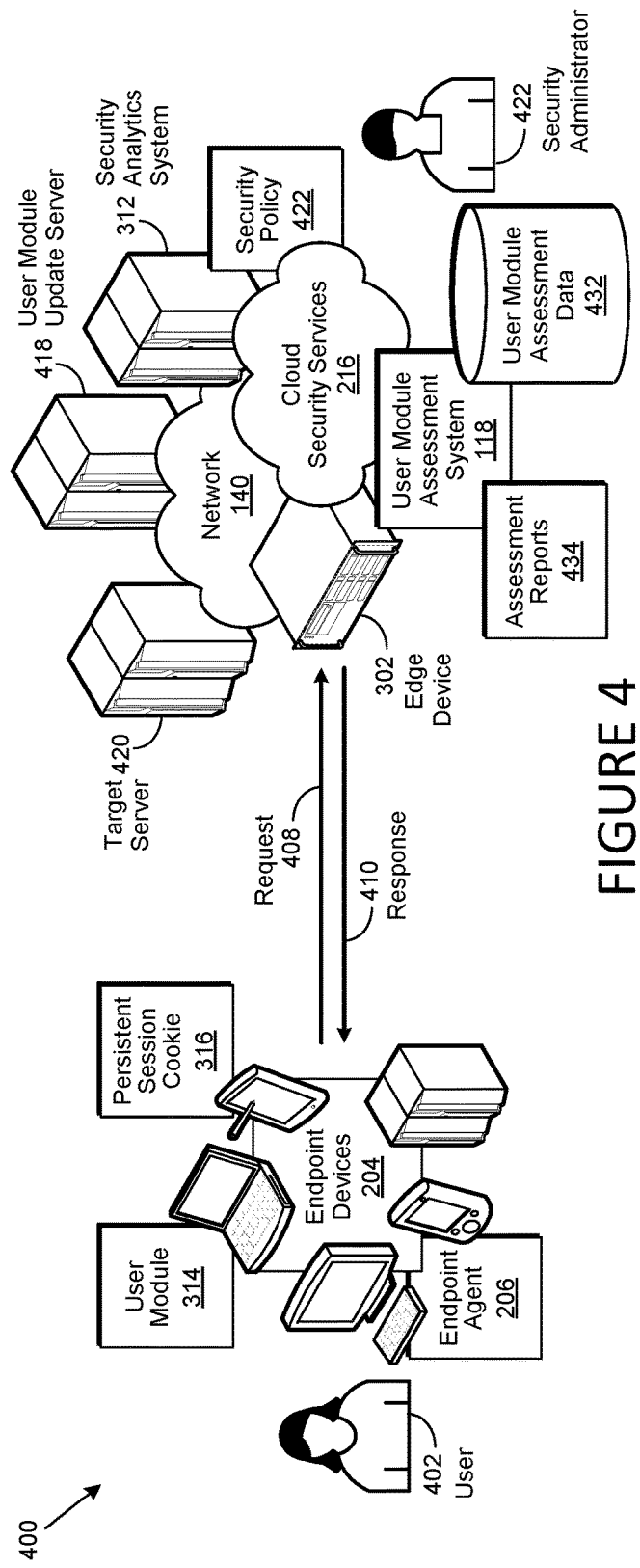
FIG. 4 is a simplified block diagram of a user module assessment environment.

FIG. 4 is a simplified block diagram of a user module assessment environment implemented in accordance with an embodiment of the invention. In certain embodiments, the user module assessment environment 400 may be implemented to perform operations related to assessing security vulnerabilities associated with a user module 314, its user 402, or both. In various embodiments, the user module assessment system 118 may be implemented to use a persistent session cookie 316, as described in greater detail herein, to determine whether or not such assessment operations should be performed.

Various embodiments of the invention reflect an appreciation that certain users 314 may have occasion to use an endpoint device 204 that is not protected by a corresponding endpoint agent 206. Certain embodiments of the invention likewise reflect an appreciation that a user 402 of such an endpoint device 204 may desire to place a request 408 to a target server 420 for certain content it may provide. In certain embodiments, the target server 420 may be implemented as a web server, which may in turn be implemented to host a website. As used herein, a website broadly refers to a collection of related web pages which are identified with a common domain name and is published on at least one web server. In certain embodiments, a website may be accessible via a public Internet Protocol (IP) network 140, such as the Internet, a private local network 140, or a combination thereof.

As used herein, a web page broadly refers to a document that is accessible via a browser, which displays the web page via a display of an endpoint device 204. In certain embodiments, the web page may also include a file implemented to cause the document to be presented via the browser. In certain embodiments, the web page may include a static web page, which is delivered exactly as stored and a dynamic web page, which may be generated by a web application that is driven by software that enhances the web page via user 402 input to a web server. Likewise, certain embodiments of the invention reflect an appreciation that such a target server 420 may respond 410 with content, such as a web page, that may prove deleterious, whether intentional or not, to the endpoint device 204, its associated user 402, or both.

In certain embodiments, the user module 314 may be implemented to use Hypertext Transfer Protocol (HTTP) to place the request 408 and communicate information over the network 140. Likewise, the user module 314 may be implemented in certain embodiments to use Secure HTTP (HTTPS) to place the request 408 and communicate information over the network 140. Certain embodiments of the invention reflect an appreciation that while HTTPS may protect the integrity of communication information communicated over a network 140, it does not protect an endpoint device 204, a user module 314, or their associated user 402, from the deleterious effects of malware.

Referring now to FIG. 4, automated user module assessment operations are begun in certain embodiments by receiving a request 408 from a user module 314 via an edge device 302, as described in greater detail herein. A determination is then made whether the request 408 includes a persistent session cookie 316. In various embodiments, the persistent session cookie 316 may be implemented to contain certain session information, described in greater detail herein. In certain embodiments, the session information may include information related to one or more user modules 314, their associated endpoint devices 204, their associated users 402, temporal information related to the user module's 314 most recent session with the edge device 302, or a combination thereof. In certain embodiments, the session information may likewise include associated user behavior information, contextual information, or a combination thereof, described in greater detail herein.

In certain embodiments, the session information related to the one or more user modules 314 may include the version of the user module 314 and associated extensions, plug-ins, associated software applications, or a combination thereof. In certain embodiments, the session information associated with a particular endpoint device 204 may include the version of its Operating System (OS), its Media Access Control (MAC) address, its currently assigned Internet Protocol (IP) address, various hardware identifiers (e.g., a serial number), or a combination thereof. In various embodiments, the session information associated with a user 402 of the endpoint device 204 may include certain user identification and authentication information, such as a user ID, or a reference to a user profile.

If it is determined that the request 408 does not include a persistent session cookie 316, then one is generated and associated with the user module 314. Otherwise, the persistent session cookie 316 included with the request 408 is processed to determine when user module's 314 last session with the edge device 302 occurred. Once it is determined how long it has been since the last session occurred, a determination is made whether the user module 314 or its associated user 402 should be assessed to detect security vulnerabilities. In certain embodiments, the period of time selected to determine whether the user module 314 or its associated user 402 should be assessed is configurable. As an example, the period of time may be configured such that if the prior session occurred within 24 hours, then an assessment may not be performed. Conversely, the period of time may be configured such that an assessment may be performed if it has been more than 24 hours since the last assessment was performed.

If it was determined that a user module 314 or its associated user 402 should be assessed, then various information contained in the existing persistent session cookie 316 is reset. Thereafter, or after a new persistent session cookie 316 has been generated and associated with the user module 314, the user module 314 is redirected for assessment. In certain embodiments, the redirection may include transparent traffic routing approaches familiar to those of skill in the art, such as Generic Routing Encapsulation (GRE)/Internet Protocol Security (IPSec), Layer 3 (L3) traffic interception, proxy auto-config (PAC) file, and so forth.

The user 402 of the user module 314 is then notified that an assessment of security vulnerabilities associated with the user module 314, its user 402, or both, will be performed. In certain embodiments, the security vulnerabilities to be assessed, and the content of the notification of impending assessment, is a matter of design choice. Various assessment operations are then performed to assess the user module 314, or its associated user 402, or a combination thereof, to detect possible security vulnerabilities.

As an example, various scripts may be implemented to determine whether the user module 314 contains any vulnerable versions. In certain embodiments, the scripts may be implemented to use ECMAScript (ES), provided by Ecma International®, Javascript, provided by Oracle Corporation®, or Hypertext Mark-up Language, version 5 (HTML5), or other scripting languages familiar to skilled practitioners of the art. As another example, a browser may be known to be vulnerable to certain exploits. Protection from these attacks may be implemented by controlling or filtering content such that content used in the exploit is not passed to the browser. Those of skill in the art will be aware that many such examples of assessment operations are possible. Accordingly, the foregoing is not intended to limit the spirit, scope or intent of the invention.

The results of the assessment are then provided to the user 402 as feedback and added to various assessment reports 434. A determination is then made whether the user module 314, or its associated endpoint device 204, are compliant with their associated organization's security policies. In certain embodiments, the compliance may include ensuring that approved versions of various components of the user module 314 are installed. In certain embodiments, the compliance may include ensuring that certain components of a user module 314 are not installed. In certain embodiments, the compliance may include ensuring that the endpoint device 204 is configured according to the organization's security policies.

In certain embodiments, the compliance may include whether any security vulnerabilities were detected during the performance of the assessment. If it is determined that the user module 314, or its associated endpoint device, is not determined to be compliant, then the persistent session cookie 316 is updated to reflect that no security vulnerabilities were detected. Otherwise, a determination is made whether to update the user module 314 to address the detected security vulnerabilities. If so, then the necessary user module 314 updates are retrieved from a user module update server 418 and then applied to the user module 314.

In certain embodiments, the user module 314 may not be automatically applied to the user module 314. Instead, the user 402 may be notified of their availability and be prompted to initiate their application at a later date. In various embodiments, the user module 314 updates may contain certain content that may conflict with the organization's security policies. In certain embodiments, such user module 314 updates may not be applied unless approved, such as the approval of a security administrator 422.

Thereafter, or if it was determined to not update the user module 314, then a determination is made whether an endpoint agent 206 is implemented on the user's 402 associated endpoint device 204. If so, then a determination is made whether to use the endpoint agent 206 to identify other security vulnerabilities associated with the endpoint device 204 or its associated user 402. As an example, certain hardware components of a particular endpoint device 204 may have known security vulnerabilities. As another example, a particular operating system (OS) may have various known security vulnerabilities. As yet another example, various software applications may have certain known security vulnerabilities. As yet still another example, one user 402 may be considered more risky than another.

If it was determined to use the endpoint agent 206 to detect other security vulnerabilities, then it is used to perform additional security vulnerability assessments. A determination is then made whether any additional security vulnerabilities were detected. If so, then the detected security vulnerabilities are remediated. As an example, an endpoint device 204 with known security vulnerabilities may be blocked from communicating certain types of information. As another example, a particular version of an OS with known vulnerabilities may be updated to a newer version. As yet another example, certain applications using file types with known vulnerabilities may be blocked from executing. As yet still another example, a risky user 402 may be conditionally blocked from accessing certain classes of content.

Thereafter, or if it was determined that no endpoint agent 206 is implemented on the user's 402 associated endpoint device 204, or no additional security vulnerabilities were previously detected, then a determination is made whether to block the request 408. If so, it is blocked. As an example, a user module 314 may initiate a session with an edge device 302 by submitting a request to connect to a particular website. In response, the user module assessment system 118 may submit a script to the user module 314 to request information regarding its current configuration. The user module assessment system 118 then processes the information to perform an assessment of the user module 314 to detect possible security vulnerabilities, as described in further detail herein. The results of the assessment is then stored in a persistent session cookie, which is in turn stored on the user device 204 associated with the user module 314. Thereafter, the results of the assessment stored in the persistent session cookie are used by the edge device 302 in subsequent sessions to determine whether to allow a request submitted by the user module 314.

Otherwise, a determination is made whether to conditionally allow the request according to a security policy 422 associated with the user 402, the user module 314, or an endpoint agent 206. If so, then the user's associated security policy 422 is retrieved and used to conditionally allow the request 408. In certain embodiments, the conditional access may include blocking a particular user 402 or user module 314 from accessing the network 114. In certain embodiments, the conditional access may include restricting browsing to whitelisted destinations or low-risk websites. In certain embodiments, the conditional access may include blocking specific file types associated with software applications that have known security vulnerabilities. In certain embodiments, the conditional access may include various remedial actions that can be implemented in an inline proxy familiar to those of skill in the art. Skilled practitioners of the art will likewise recognize that many such embodiments are possible. Accordingly, the foregoing is not intended to limit the spirit, scope or intent of the invention.

In certain embodiments, the security policy 422 may be administered by an endpoint agent 206 implemented on the user's 402 endpoint device 204. In certain embodiments, the security policy 422 implemented on the endpoint device 204 may be updated to conditionally allow the request 408. In certain embodiments, the security policy 422 implemented on the endpoint device 204, and its associated updates, may be administered by a security analytics system 312.

However, if it was determined to not assess the user module 314 or its associated user 402, or if the persistent session cookie 316 has been updated, or if it was determined to not use the user's 402 associated security policy 422 to conditionally allow the request 408, then a determination is made whether or not to allow the request to proceed. In certain embodiments, the determination of whether or not to allow the request to proceed may be made according to a generalized security policy. In these embodiments, the rules associated with such a security policy, and the method by which they are enforced, are a matter of design choice. In certain embodiments, information related to various user module assessment operations, described in greater detail herein, may be stored in a repository of user module assessment data 432. In certain embodiments, the information stored in the repository of user module assessment data may be used to generate various assessment reports 434. In certain embodiments, the assessment reports may be generated automatically by the user module assessment system 118, manually by a security administrator 422, or a combination thereof.

Figure 5:
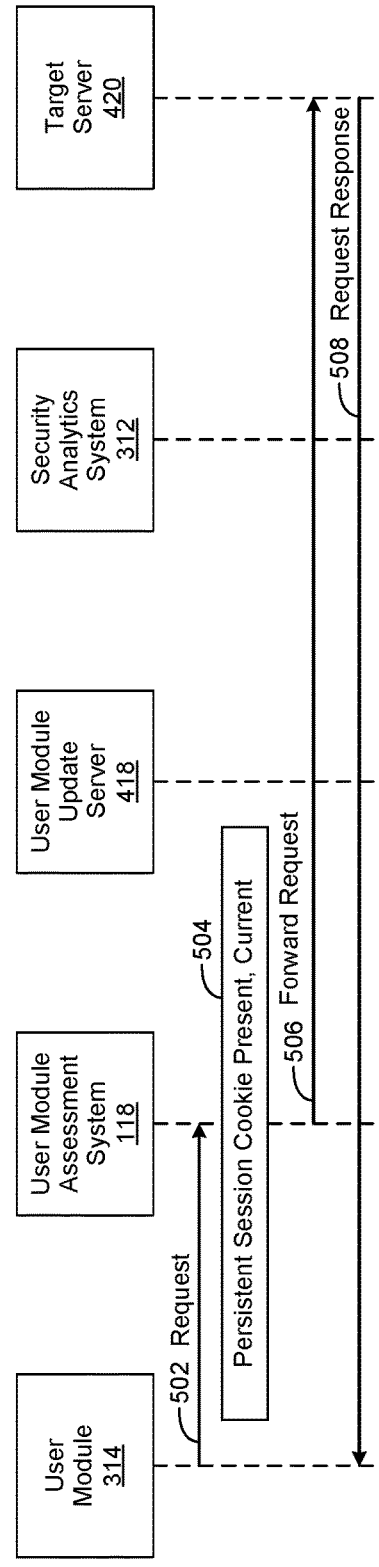
FIG. 5 shows a process flow for allowing a user module request to proceed if an associated persistent session cookie is present and current.

FIG. 5 shows a process flow implemented in accordance with an embodiment of the invention for allowing a user module request to proceed if an associated persistent session cookie is present and current. In this embodiment, a user module 314 submits a request to a user module assessment system 118 in step 502. Then, in step 504, the user module assessment system 118 determines a persistent session cookie corresponding to the request is present and that it is current. Accordingly, the request is forwarded in step 506 by the user module assessment system 118 to the target server 420 designated in the request. In turn, the target server 420 provides a response to the request in step 508 to the user module 314.

Figure 6:
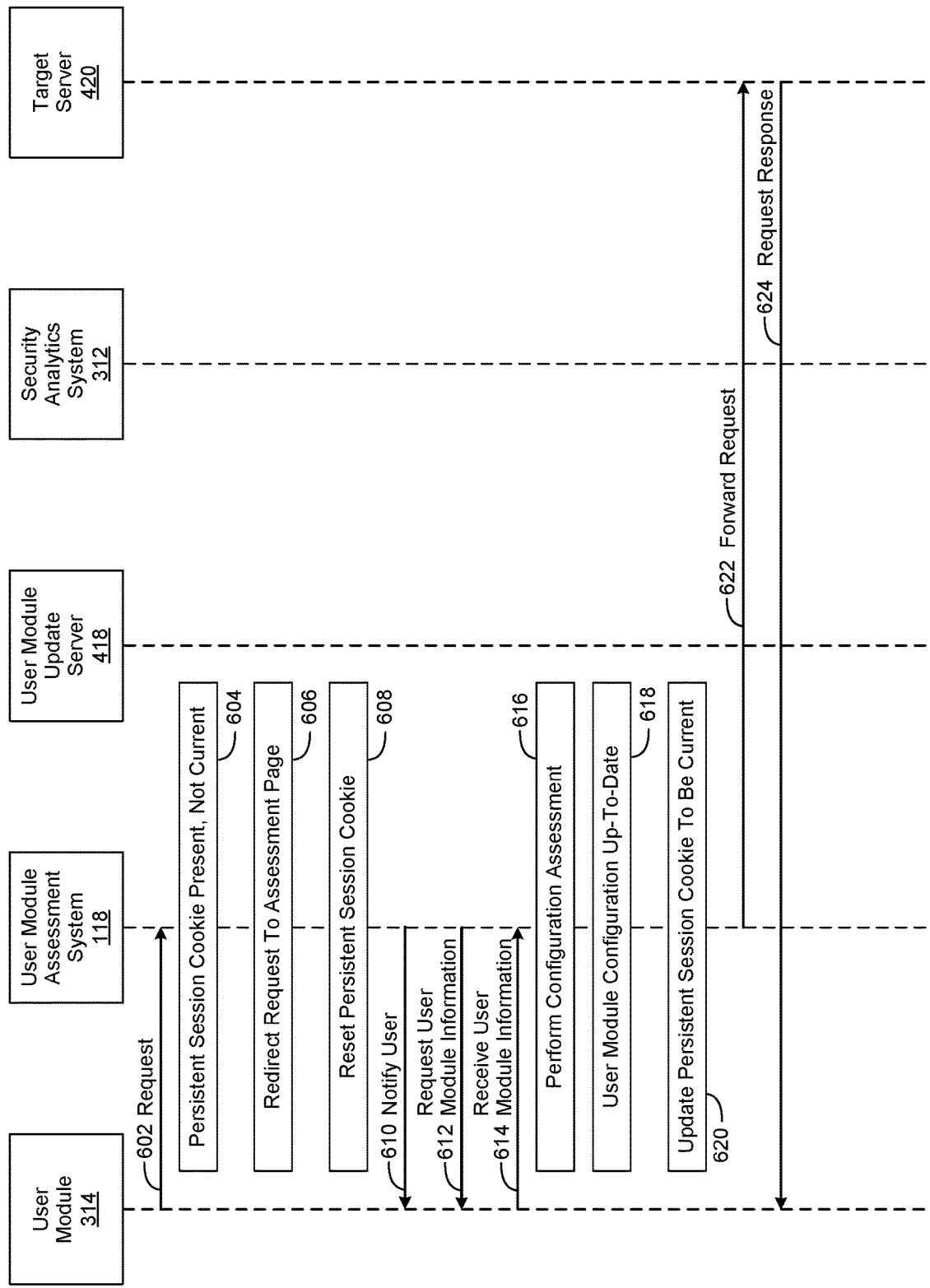
FIG. 6 shows a process flow for blocking a user module request until an associated user module is confirmed to be current.

FIG. 6 shows a process flow implemented in accordance with an embodiment of the invention for blocking a user module request until an associated user module is confirmed to be current. In this embodiment, a user module 314 submits a request to a user module assessment system 118 in step 602. Then, in step 604, the user module assessment system 118 determines a persistent session cookie corresponding to the request is present, but it is not current. Accordingly, the request is redirected in step 606 to an assessment page, described in greater detail herein, followed by certain parameters of the persistent session cookie being reset in step 608, as likewise described in greater detail herein.

Once the parameters of the persistent session cookie have been reset, the user of the user module 314 is notified in step 610 that their associated user module 314 will be assessed to detect security vulnerabilities. Various user module information is then requested from the user module 314 by the user module assessment system 118 in step 612, followed by its provision by the user module 314 to the user module assessment system 118 in step 614. A user module configuration assessment is then performed by the user module assessment system 118, as described in greater detail herein, on the provided user module information in step 616.

If it is determined in step 618 that the configuration of the user module 314 is up to date, then various parameters of the persistent session cookie are set by the user module assessment system 118 in step 620 to reflect it being current. The request is then forwarded in step 622 by the user module assessment system 118 to the target server 420 designated in the request. In turn, the target server 420 provides a response to the request in step 624 to the user module 314.

Figure 7:
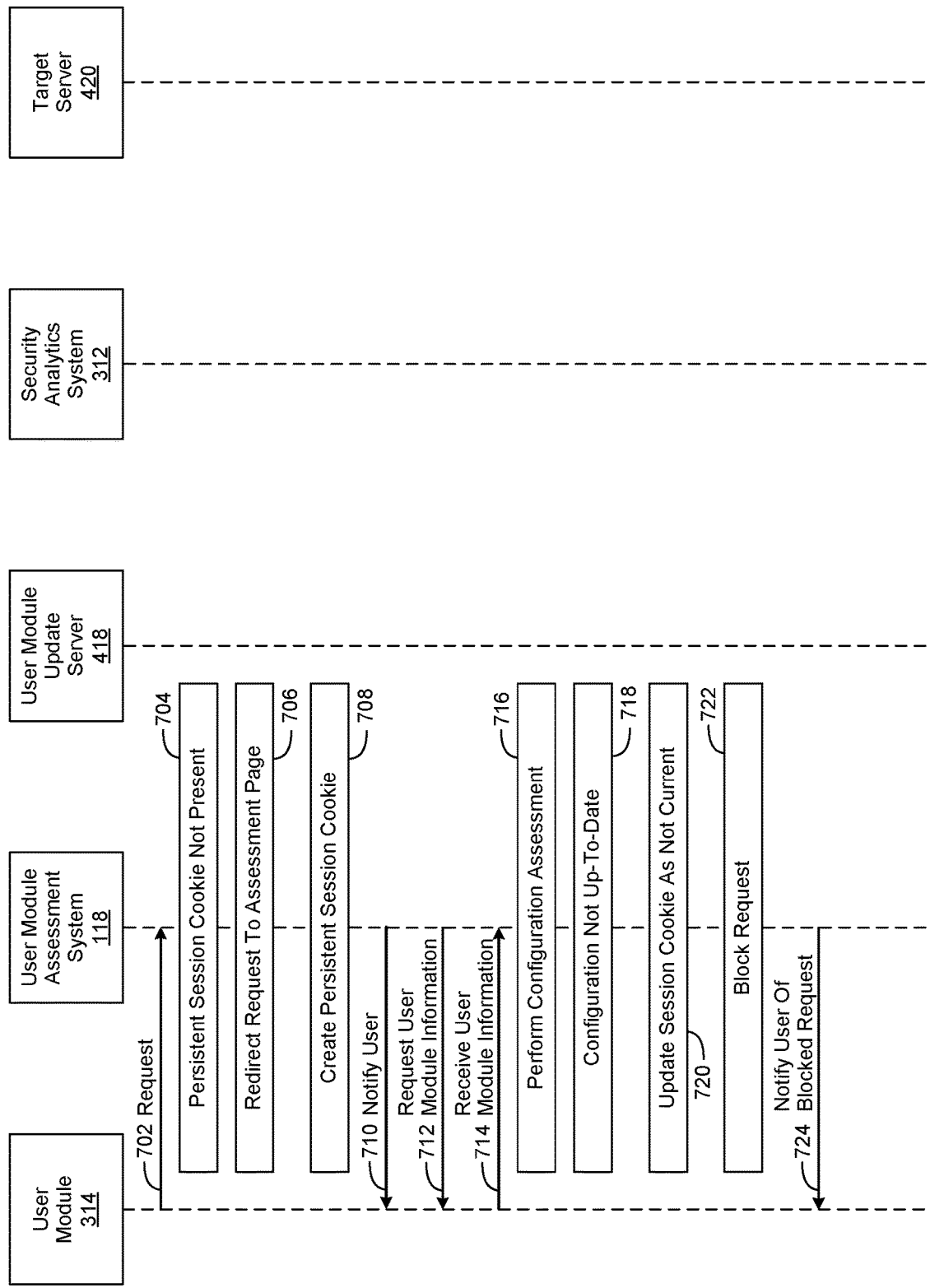
FIG. 7 shows a process flow for blocking a user module request when a corresponding persistent session cookie is not present and its associated user module is confirmed to not be current.

FIG. 7 shows a process flow implemented in accordance with an embodiment of the invention for blocking a user module request when a corresponding persistent session cookie is not present and its associated user module is confirmed to not be current. In this embodiment, a user module 314 submits a request to a user module assessment system 118 in step 702. Then, in step 704, the user module assessment system 118 determines a persistent session cookie corresponding to the request is not present. Accordingly, the request is redirected in step 706 to an assessment page, described in greater detail herein, followed by the creation of a persistent session cookie in step 708.

Once the persistent session cookie has been created, the user of the user module 314 is notified in step 710 that their associated user module 314 will be assessed to detect security vulnerabilities. Various user module information is then requested from the user module 314 by the user module assessment system 118 in step 712 followed by its provision by the user module 314 to the user module assessment system 118 in step 714. A user module configuration assessment is then performed by the user module assessment system 118 on the provided user module information in step 716, as described in greater detail herein. If it is determined in step 718 that the configuration of the user module 314 is not up to date, then various parameters of the persistent session cookie are set by the user module assessment system 118 in step 720 to reflect it not being current. The request is then blocked in step 722 by the user module assessment system 118, which in turn notifies the user of the user module 314 in step 724 of the request being blocked.

Figure 8:
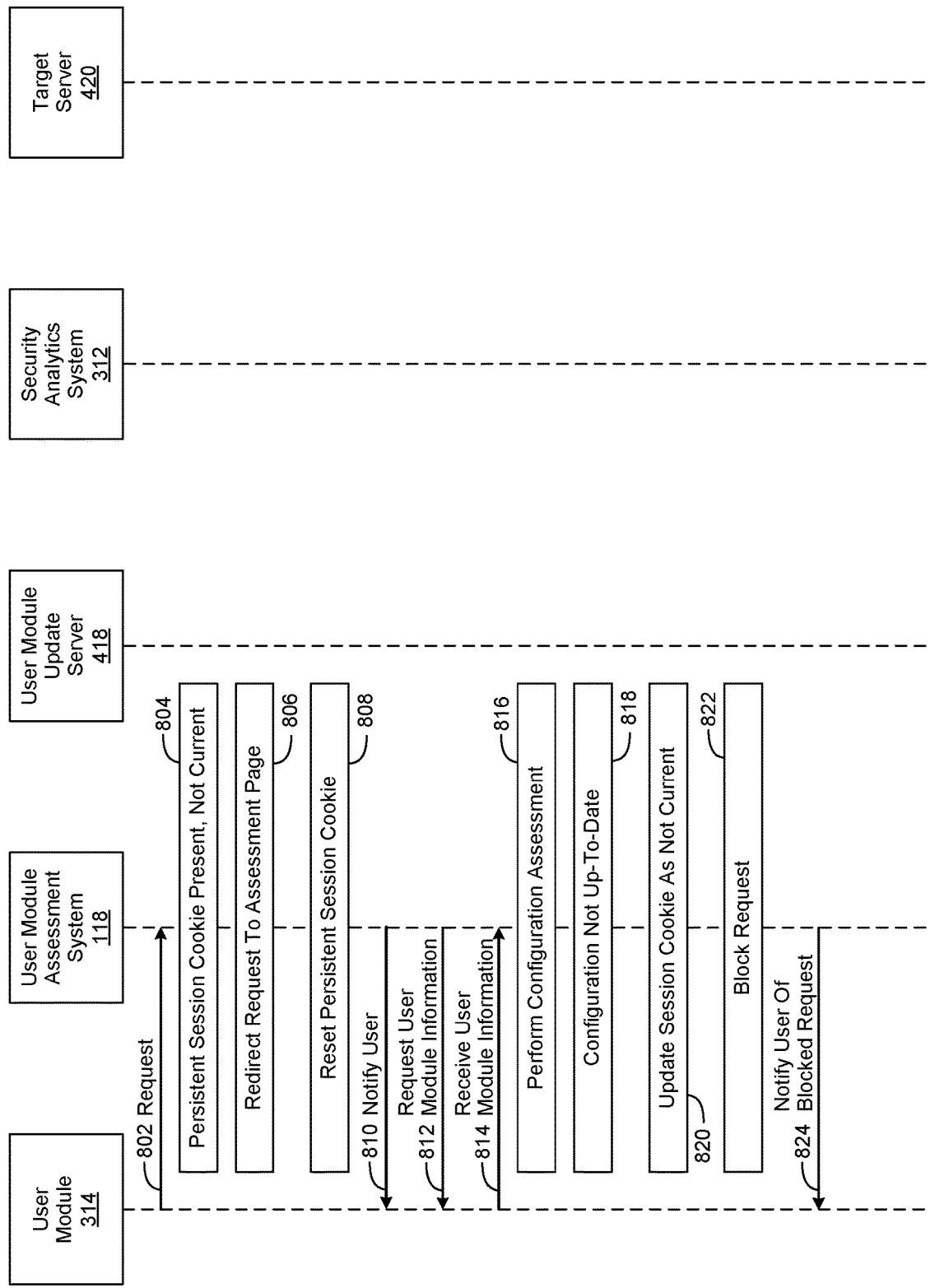
FIG. 8 shows a process flow for blocking a user module request when a corresponding persistent session cookie is present, but not current, and its associated user module is likewise confirmed to not be current.

FIG. 8 shows a process flow implemented in accordance with an embodiment of the invention for blocking a user module request when a corresponding persistent session cookie is present, but not current, and its associated user module is likewise confirmed to not be current. In this embodiment, a user module 314 submits a request to a user module assessment system 118 in step 802. Then, in step 804, the user module assessment system 118 determines a persistent session cookie corresponding to the request is present, but that it is not current. Accordingly, the request is redirected in step 806 to an assessment page, described in greater detail herein, followed by certain parameters of the persistent session cookie being reset in step 808, as likewise described in greater detail herein.

Once the parameters of the persistent session cookie have been reset, the user of the user module 314 is notified in step 810 that their associated user module 314 will be assessed to detect security vulnerabilities. Various user module information is then requested from the user module 314 by the user module assessment system 118 in step 812, followed by its provision by the user module 314 to the user module assessment system 118 in step 814. A user module configuration assessment is then performed by the user module assessment system 118 on the provided user module information in step 816, as described in greater detail herein.

If it is determined in step 818 that the configuration of the user module 314 is not up to date, then various parameters of the persistent session cookie are set by the user module assessment system 118 in step 820 to reflect it not being current. The request is then blocked in step 822 by the user module assessment system 118, which in turn notifies the user of the user module 314 in step 824 of the request being blocked.

Figure 9:
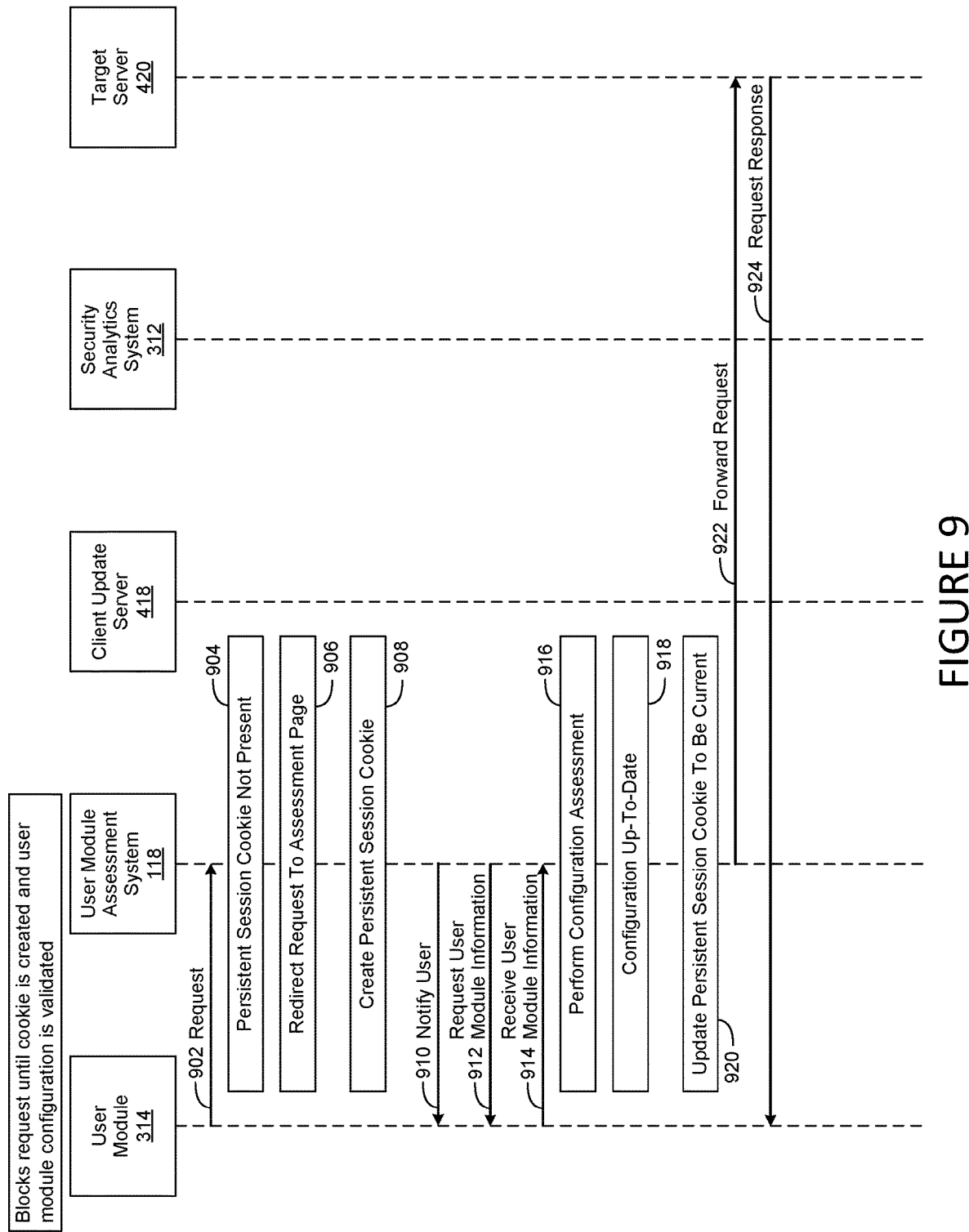
FIG. 9 shows a process flow for allowing a user module request to proceed once a corresponding persistent session cookie is created and an associated user module is confirmed to be current.

FIG. 9 shows a process flow implemented in accordance with an embodiment of the invention for allowing a user module request to proceed once a corresponding persistent session cookie is created and an associated user module is confirmed to be current. In this embodiment, a user module 314 submits a request to a user module assessment system 118 in step 902. Then, in step 904, the user module assessment system 118 determines a persistent session cookie corresponding to the request is not present. Accordingly, the request is redirected in step 906 to an assessment page, described in greater detail herein, followed by the creation of a persistent session cookie in step 908.

Once the persistent session cookie has been created, the user of the user module 314 is notified in step 910 that their associated user module 314 will be assessed to detect security vulnerabilities. Various user module information is then requested from the user module 314 by the user module assessment system 118 in step 912 followed by its provision by the user module 314 to the user module assessment system 118 in step 914. A user module configuration assessment is then performed by the user module assessment system 118 on the provided user module information in step 916, as described in greater detail herein.

If it is determined in step 918 that the configuration of the user module 314 is up to date, then various parameters of the persistent session cookie are set by the user module assessment system 118 in step 920 to reflect it being current. The request is then forwarded in step 922 by the user module assessment system 118 to the target server 420 designated in the request. In turn, the target server 420 provides a response to the request in step 924 to the user module 314.

Figure 10:
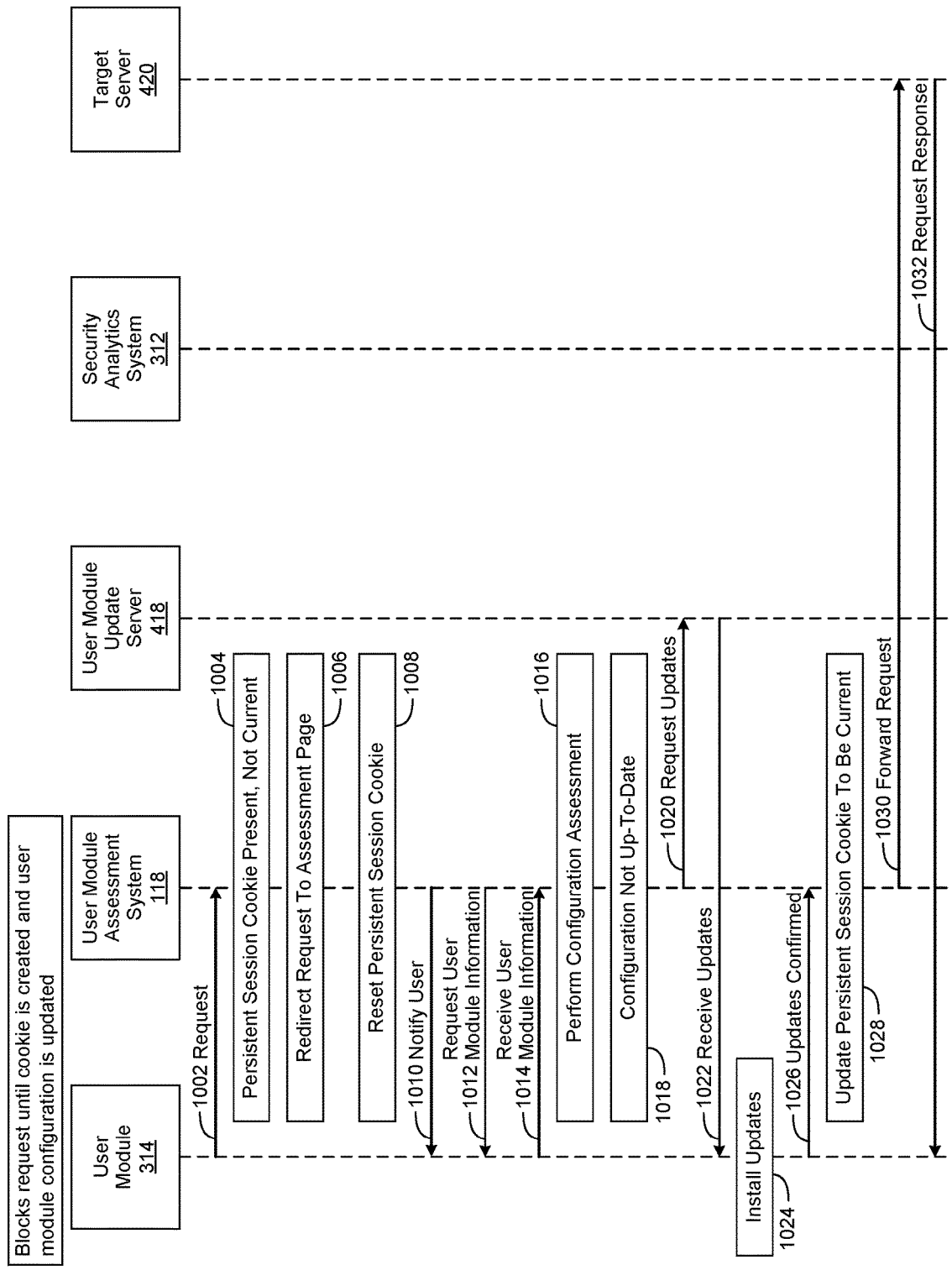
FIG. 10 shows a process flow for allowing a user module request to proceed once an associated user module is updated to be current.

FIG. 10 shows a process flow implemented in accordance with an embodiment of the invention for allowing a user module request to proceed once an associated user module is updated to be current. In this embodiment, a user module 314 submits a request to a user module assessment system 118 in step 1002. Then, in step 1004, the user module assessment system 118 determines a persistent session cookie corresponding to the request is present, but it is not current. Accordingly, the request is redirected in step 1006 to an assessment page, described in greater detail herein, followed by certain parameters of the persistent session cookie being reset in step 1008, as likewise described in greater detail herein.

Once the parameters of the persistent session cookie have been reset, the user of the user module 314 is notified in step 1010 that their associated user module 314 will be assessed to detect security vulnerabilities. Various user module information is then requested from the user module 314 by the user module assessment system 118 in step 1012, followed by its provision by the user module 314 to the user module assessment system 118 in step 1014. A user module configuration assessment is then performed by the user module assessment system 118, as described in greater detail herein, on the provided user module information in step 1016.

If it is determined in step 818 that the configuration of the user module 314 is not up to date, then updates to the user module 314 are requested from a user module update server 418 in step 1020 to address any detected security vulnerabilities. The requested updates are then provided by the user update server 418 to the user module 314 in step 1022, where they are installed in step 1024. Once installed, a confirmation of their successful installation is provided by the user module 314 to the user module assessment system 118 in step 1026. Various parameters of the persistent session cookie are set by the user module assessment system 118 in step 1028 to reflect it being current. The request is then forwarded in step 1030 by the user module assessment system 118 to the target server 420 designated in the request. In turn, the target server 420 provides a response to the request in step 1032 to the user module 314.

Figure 11:
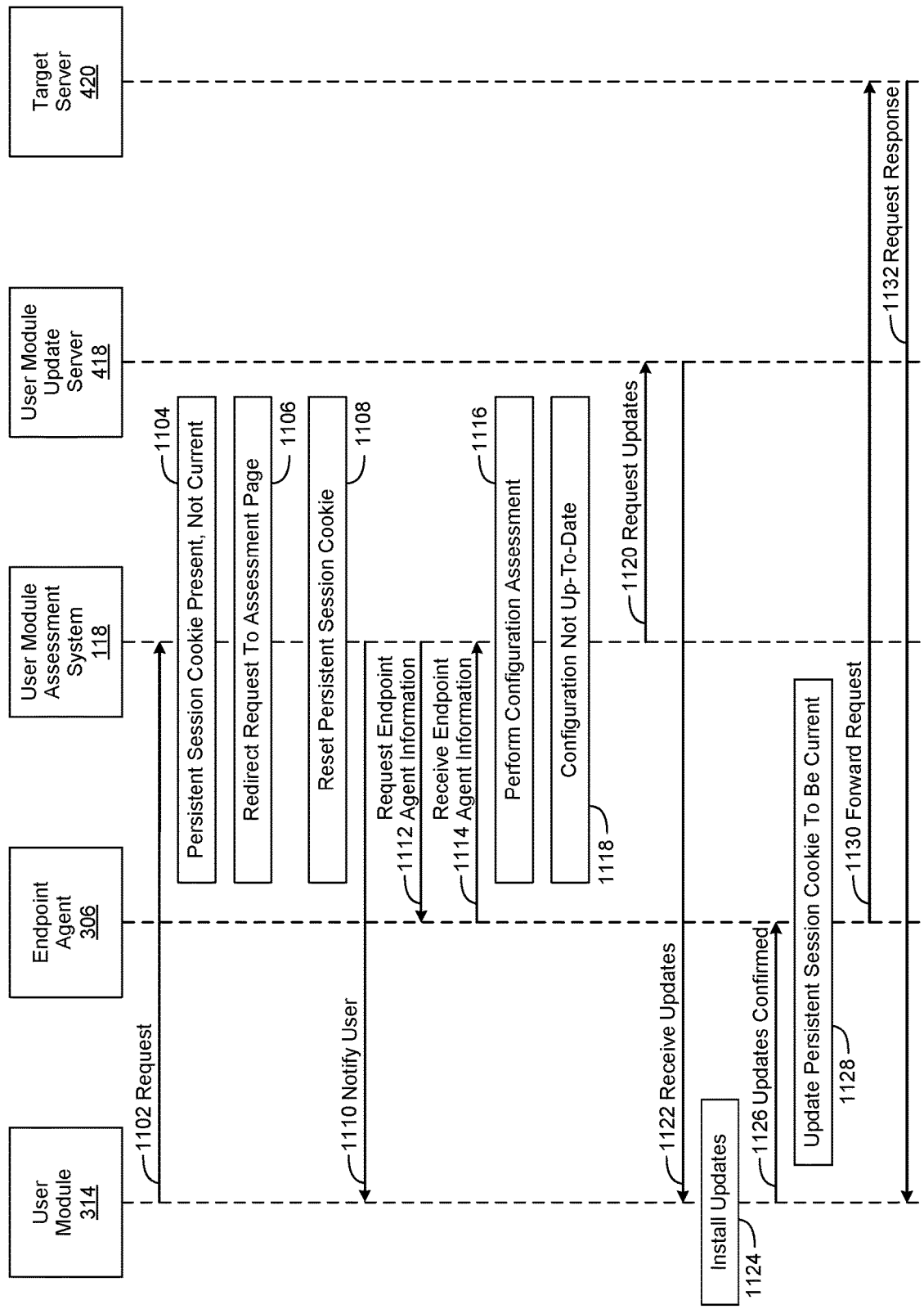
FIG. 11 shows a process flow for using an endpoint agent to detect a security vulnerability of an associated user module or user.

FIG. 11 shows a process flow implemented in accordance with an embodiment of the invention for using an endpoint agent to detect a security vulnerability with an associated user module or user. In this embodiment, a user module 314 submits a request to a user module assessment system 118 in step 1102. Then, in step 1104, the user module assessment system 118 determines a persistent session cookie corresponding to the request is present, but it is not current. Accordingly, the request is redirected in step 1106 to an assessment page, described in greater detail herein, followed by certain parameters of the persistent session cookie being reset in step 1108, as likewise described in greater detail herein.

Once the parameters of the persistent session cookie have been reset, the user of the user module 314 is notified in step 1110 that their associated user module 314, information associated with the user, or a combination thereof, will be assessed to detect security vulnerabilities. Various user module information is then requested from the endpoint agent 306 associated with the user module 314 by the user module assessment system 118 in step 1012, followed by its provision by the endpoint agent 306 to the user module assessment system 118 in step 1114. A user module configuration assessment is then performed by the user module assessment system 118, as described in greater detail herein, on the provided user module information in step 1116.

If it is determined in step 1118 that the configuration of the user module 314 is not up to date, then updates to the user module 314 are requested from a user module update server 418 in step 1120 to address any detected security vulnerabilities. The requested updates are then provided by the user update server 418 to the user module 314 in step 1122, where they are installed in step 1124. Once installed, a confirmation of their successful installation is provided by the user module 314 to the user module assessment system 118 in step 1126. Various parameters of the persistent session cookie are set by the user module assessment system 118 in step 1028 to reflect it being current. The request is then forwarded in step 1030 by the user module assessment system 118 to the target server 420 designated in the request. In turn, the target server 420 provides a response to the request in step 1032 to the user module 314.

Figure 12:
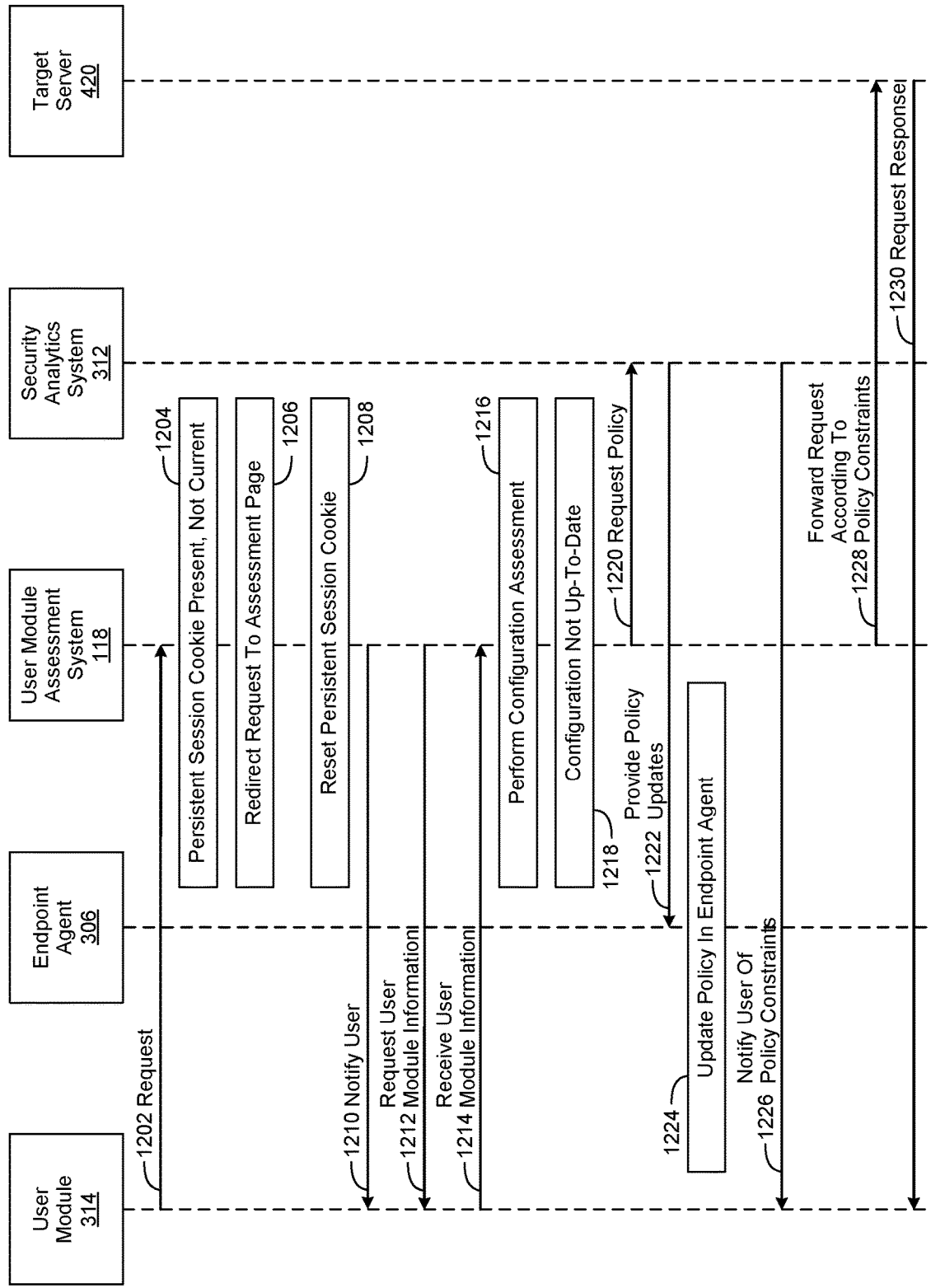
FIG. 12 shows a process flow for using a security policy to conditionally allow a user module request to proceed when a security vulnerability of an associated user module or user has been detected.

FIG. 12 shows a process flow implemented in accordance with an embodiment of the invention for using a security policy to conditionally allow a user module request to proceed when a security vulnerability has been detected with an associated user module or user. In this embodiment, a user module 314 submits a request to a user module assessment system 118 in step 1202. Then, in step 1204, the user module assessment system 118 determines a persistent session cookie corresponding to the request is present, but it is not current. Accordingly, the request is redirected in step 1206 to an assessment page, described in greater detail herein, followed by certain parameters of the persistent session cookie being reset in step 1208, as likewise described in greater detail herein.

Once the parameters of the persistent session cookie have been reset, the user of the user module 314 is notified in step 1210 that their associated user module 314, information associated with the user, or a combination thereof, will be assessed to detect security vulnerabilities. Various user module information is then requested from the endpoint agent 306 associated with the user module 314 by the user module assessment system 118 in step 1212, followed by its provision by the endpoint agent 306 to the user module assessment system 118 in step 1214. A user module configuration assessment is then performed by the user module assessment system 118, as described in greater detail herein, on the provided user module information in step 1216.

If it is determined in step 1216 that the configuration of the user module 314 is not up to date, or other security vulnerabilities are detected, then updates to a security policy associated with the user of the user module 314 is requested from a security analytics system 312 in step 1220 to address any detected security vulnerabilities. In certain embodiments, it may be determined in step 1216 that while the configuration of the user module 314 may be up to date, that the associated security policy should be updated nonetheless. For example, it may be advisable to block certain content known to be associated with known security vulnerabilities. Accordingly updates to the security policy are requested in step 1220.

The requested security policy update is then provided by the security analytics system 312 to the endpoint agent 306 in step 1222, where it is then used in step 1224 to update the security policy associated with the user of the user module 314. Once the security policy has been updated, the security analytics system 312 notifies the user of user module 314 of various constraints associated with the updated security policy. The request is then forwarded in step 1028 by the user module assessment system 118 to the target server 420 designated in the request. In turn, the target server 420 provides a response to the request in step 1230 to the user module 314.

Figure 13A:
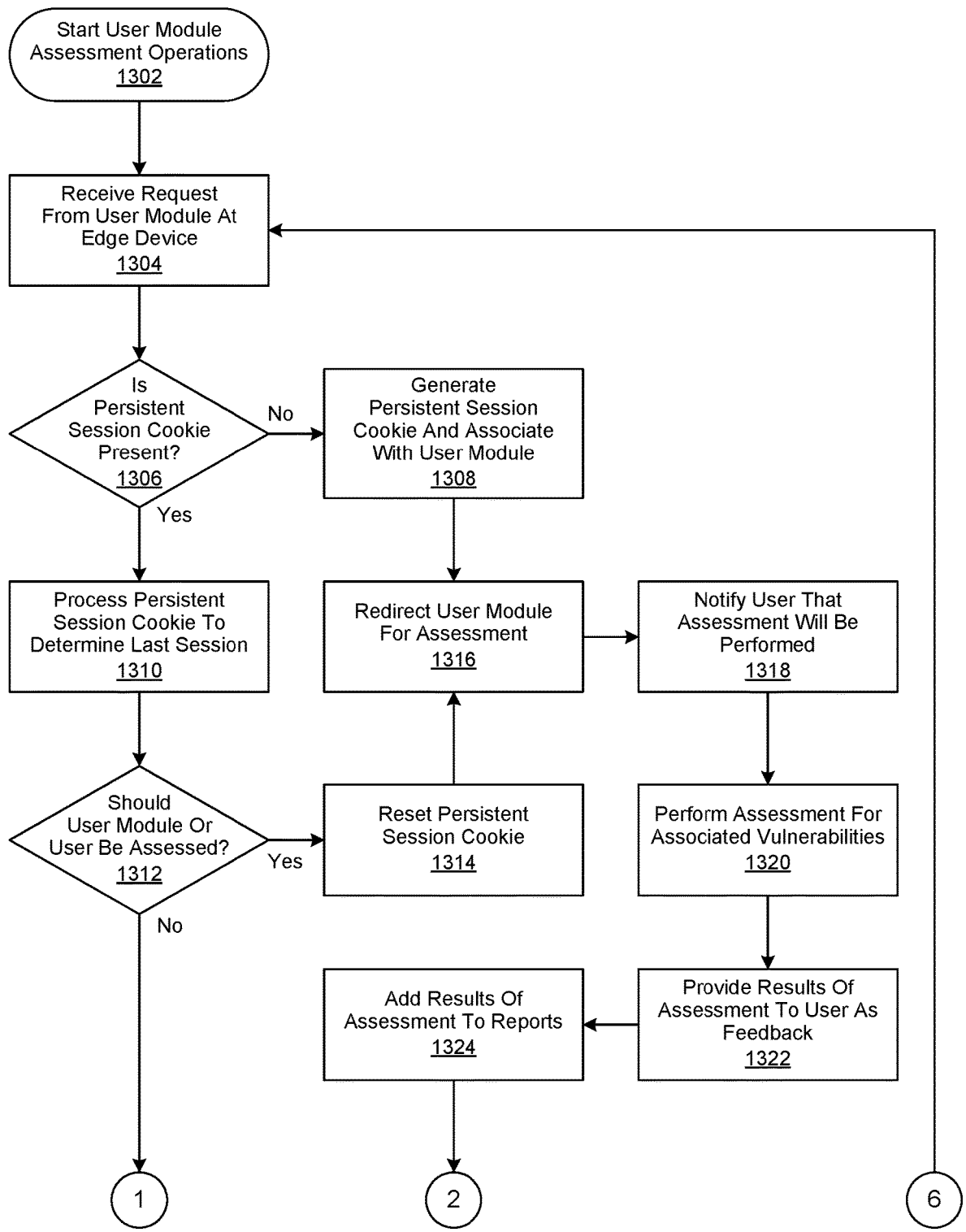
FIGS. 13a through 13c are a flowchart showing the performance of automated user module assessment operations performed in accordance with an embodiment of the invention.
Figure 13B:
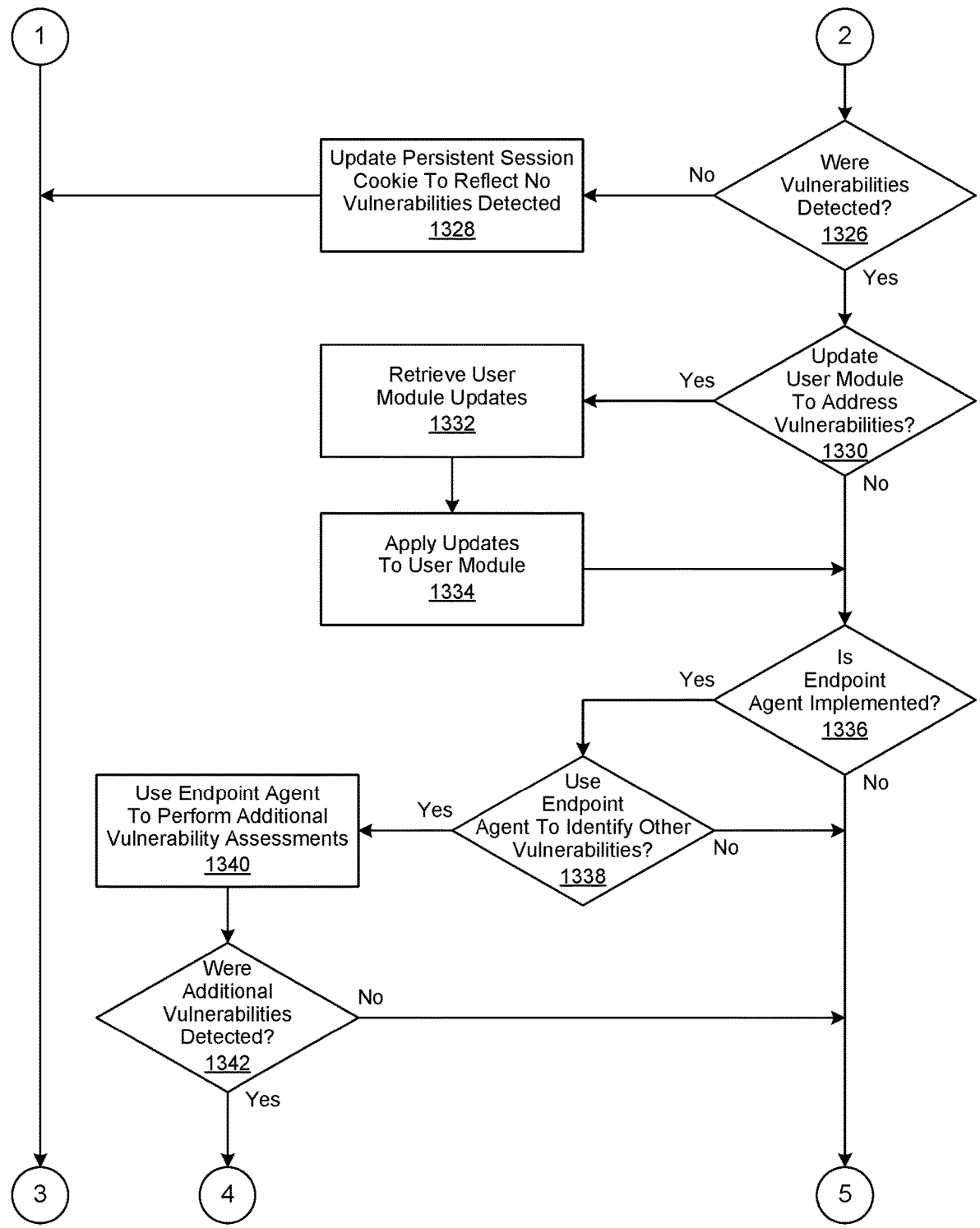
Figure 13C:
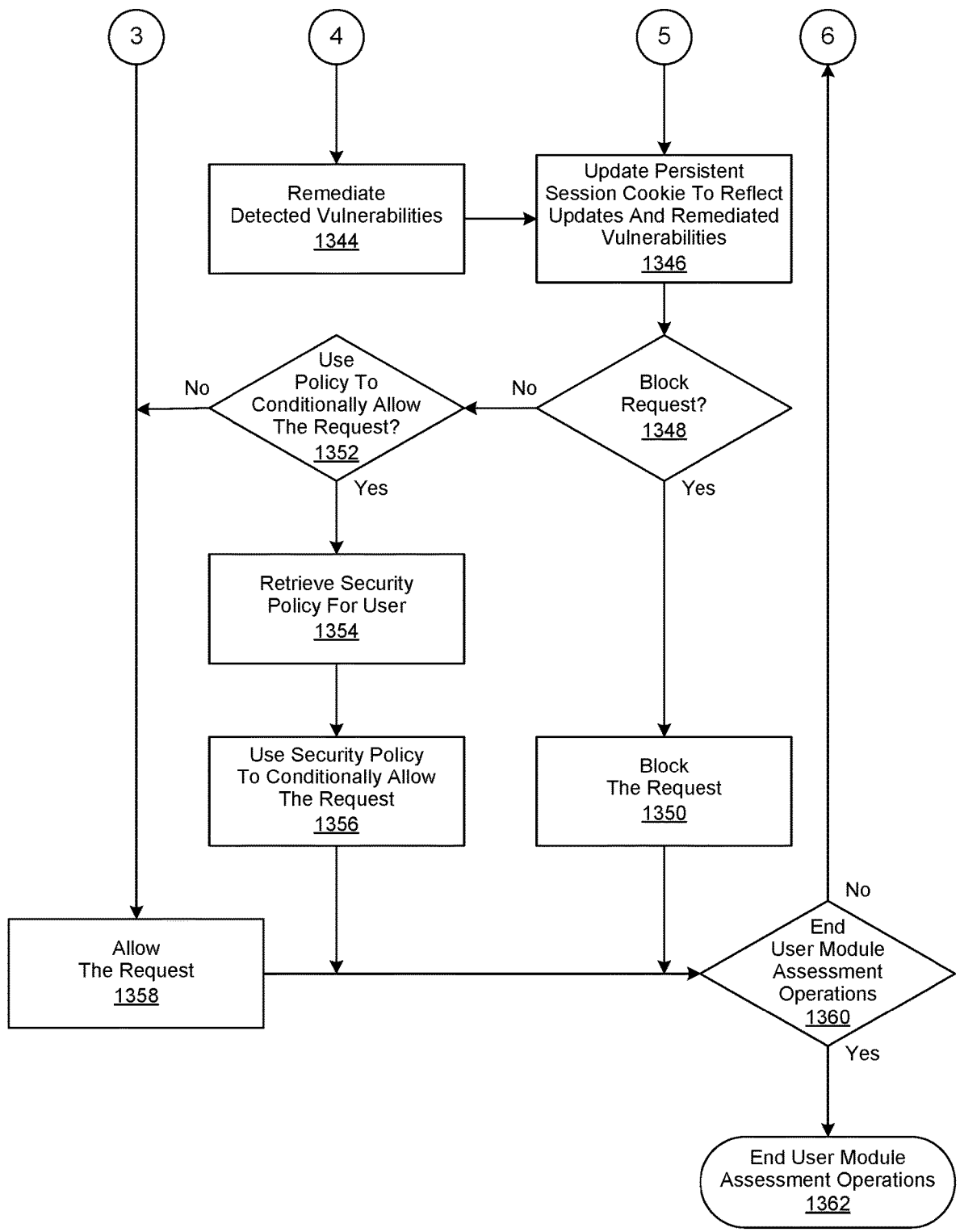

FIGS. 13a through 13c are a flowchart showing the performance of automated user module assessment operations performed in accordance with an embodiment of the invention. In this embodiment, automated user module assessment operations are begun in step 1302, followed by receiving a request from a user module via an edge device, as described in greater detail herein, in step 1304. In certain embodiments, the request may be a Hypertext Transfer Protocol (HTTP) request familiar to skilled practitioners of the art. In certain embodiments, the edge device may be implemented as a secure web gateway.

A determination is then made in step 1306 whether the request includes a persistent session cookie, likewise described in greater detail herein. If not, then one is generated and associated with the user module in step 1308. Otherwise, the persistent session cookie included with the request is processed in step 1310 to determine when the user module's last session with the edge device occurred. Once it is determined how long it has been since the last session occurred, a determination is made in step 1312 whether the user module, or its associated user, should be assessed.

If it was determined in step 1312 that a user module or its associated user should be assessed, then various information contained in the persistent session cookie is reset in step 1314. Thereafter, or after a new persistent session cookie has been generated and associated with the user module in step 1308, the user module is redirected in step 1316 for assessment. The user of the user module is then notified in step 1318 that an assessment of security vulnerabilities associated with the user module, its user, or both, will be performed. Various assessment operations, described in greater detail herein, are then performed in step 1320 to assess the user module, or its associated user, or a combination thereof, to detect possible security vulnerabilities. The results of the assessment are then provided to the user in step 1322 as feedback and added to various reports in step 1324.

A determination is then made in step 1326 whether any security vulnerabilities were detected during the performance of the assessment. If not, then the persistent session cookie is updated in step 1328 to reflect that no security vulnerabilities were detected. Otherwise, a determination is made in step 1330 whether to update the user module to address the detected security vulnerabilities. If so, then the necessary user module updates are retrieved from a user module update server in step 1332 and then applied to the user module in step 1334. Thereafter, or if it was determined in step 1330 to not update the user module, then a determination is made in step 1336 whether an endpoint agent is implemented on the user's endpoint device. If so, then a determination is made in step 1338 whether use the endpoint agent to identify other security vulnerabilities associated with the endpoint device or its user.

If it was determined in step 1338 to use the endpoint agent to detect other security vulnerabilities, then it is used to perform additional security vulnerability assessments in step 1340. A determination is then made in step 1342 whether any additional security vulnerabilities were detected. If so, then the detected security vulnerabilities are remediated in step 1344. Thereafter, or if it was determined in step 1336 that no endpoint agent is implemented, or not to use the endpoint agent in step 1338, or no additional security vulnerabilities were detected in step 1342, then a determination is made in step 1348 whether to block the request. If so, it is blocked in step 1360. If not, then a determination is made in step 1352 whether to conditionally allow the request according to a security policy associated with the user or the user module. If so, then the user's associated security policy is retrieved in step 1354 and used in step 1356 to conditionally allow the request.

However, if it was determined in step 1312 to not assess the user module or its associated user, or if the persistent session cookie has been updated in step 1328, or if it was determined in step 1352 to not use the user's associated security policy to conditionally allow the request, then it is allowed in step 1358. Thereafter, or once the operations associated with steps 1350 or 1356 have been completed, a determination is made in step 1360 whether to end automated user module assessments. If not, the process is continued, proceeding with step 1304. Otherwise, automated user module assessments are ended in step 1362.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java®, Javascript®, ECMAScript®, Smalltalk®, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a user module assessment operation, comprising:
   receiving a request from a user module via an edge device, the user module executing on a protected endpoint, the protect endpoint comprising an endpoint device and an endpoint agent, the endpoint agent executing on a hardware processor of the endpoint device;
   determining whether the user module should be assessed to detect security vulnerabilities, the security vulnerabilities comprising a weakness which can be exploited to perform unauthorized actions within the endpoint device;
   setting user module information when the user module should be assessed to detect security vulnerabilities;
   redirecting the user module for assessment;
   performing, via a user module assessment system, an assessment of the user module to detect possible security vulnerabilities, the user module assessment system executing on the edge device; and,
   storing the user module information within a persistent session cookie, the persistent session cookie being stored on the protected endpoint, the persistent session cookie comprising a persistent cookie aspect and a session cookie aspect to persistently store information associated with a user and the user module assessment system, the persistent cookie aspect of the persistent session cookie not expiring and the session cookie aspect of the persistent session cookie containing information related to a session between the user module and the user module assessment system.

2. The method of claim 1, further comprising:
determining whether the request has a related persistent session cookie; and,
generating the persistent session cookie when the request does not have a related persistent session cookie.

3. The method of claim 1, further comprising:
processing the persistent session cookie to determine when a session last occurred prior to determining whether the user module should be assessed for security vulnerabilities.

4. The method of claim 1, wherein:
redirecting the user module comprises a transparent traffic routing approach, the transparent traffic routing approach comprising at least one of a Generic Routing Encapsulation (GRE) traffic routing approach, an Internet Protocol Security (IPSec) traffic routing approach, a Layer 3 (L3) traffic interception traffic routing approach, and a proxy auto-config (PAC) file traffic routing approach.

5. The method of claim 1, further comprising:
updating the persistent session cookie to reflect that no security vulnerabilities were detected when the assessment of the user module to detect possible security vulnerabilities does not detect any possible security vulnerabilities.

6. The method of claim 1, wherein:
the persistent session cookie is implemented to contain certain session information, the session information including at least one of information related to the user module, an associated user module endpoint device, a user associated with the user module, temporal information related to the user module, user behavior information associated with a session, and contextual information associated with the session.

7. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
receiving a request from a user module via an edge device, the user module executing on a protected endpoint, the protect endpoint comprising an endpoint device and an endpoint agent, the endpoint agent executing on a hardware processor of the endpoint device;
determining whether the user module should be assessed to detect security vulnerabilities, the security vulnerabilities comprising a weakness which can be exploited to perform unauthorized actions within the endpoint device;
setting user module information when the user module should be assessed to detect security vulnerabilities;
redirecting the user module for assessment;
performing, via a user module assessment system, an assessment of the user module to detect possible security vulnerabilities, the user module assessment system executing on the edge device; and,
storing the user module information within a persistent session cookie, the persistent session cookie being stored on the protected endpoint, the persistent session cookie comprising a persistent cookie aspect and a session cookie aspect to persistently store information associated with a user and the user module assessment system, the persistent cookie aspect of the persistent session cookie not expiring and the session cookie aspect of the persistent session cookie containing information related to a session between the user module and the user module assessment system.

8. The system of claim 7, wherein the instructions executable by the processor are further configured for:
determining whether the request has a related persistent session cookie; and,
generating the persistent session cookie when the request does not have a related persistent session cookie.

9. The system of claim 7, wherein the instructions executable by the processor are further configured for:
processing the persistent session cookie to determine when a session last occurred prior to determining whether the user module should be assessed for security vulnerabilities.

10. The system of claim 7, wherein:
redirecting the user module comprises a transparent traffic routing approach, the transparent traffic routing approach comprising at least one of a Generic Routing Encapsulation (GRE) traffic routing approach, an Internet Protocol Security (IPSec) traffic routing approach, a Layer 3 (L3) traffic interception traffic routing approach, and a proxy auto-config (PAC) file traffic routing approach.

11. The system of claim 7, wherein the instructions executable by the processor are further configured for:
updating the persistent session cookie to reflect that no security vulnerabilities were detected when the assessment of the user module to detect possible security vulnerabilities does not detect any possible security vulnerabilities.

12. The system of claim 7, wherein:
the persistent session cookie is implemented to contain certain session information, the session information including at least one of information related to the user module, an associated user module endpoint device, a user associated with the user module, temporal information related to the user module, user behavior information associated with a session, and contextual information associated with the session.

13. A non-transitory, computer-readable storage medium embodying computer program code, the computer program code comprising computer executable instructions configured for:
receiving a request from a user module via an edge device, the user module executing on a protected endpoint, the protect endpoint comprising an endpoint device and an endpoint agent, the endpoint agent executing on a hardware processor of the endpoint device;
determining whether the user module should be assessed to detect security vulnerabilities, the security vulnerabilities comprising a weakness which can be exploited to perform unauthorized actions within the endpoint device;
setting user module information when the user module should be accessed to detect security vulnerabilities;
redirecting the user module for assessment;
performing, via a user module assessment system, an assessment of the user module to detect possible security vulnerabilities, the user module assessment system executing on the edge device; and, storing the user module information within a persistent session cookie, the persistent session cookie being stored on the protected endpoint, the persistent session cookie comprising a persistent cookie aspect and a session cookie aspect to persistently store information associated with a user and the user module assessment system, the persistent cookie aspect of the persistent session cookie not expiring and the session cookie aspect of the persistent session cookie containing information related to a session between the user module and the user module assessment system.

14. The non-transitory, computer-readable storage medium of claim 13, wherein the computer executable instructions are further configured for:
determining whether the request has a related persistent session cookie;
generating the persistent session cookie when the request does not have a related persistent session cookie.

15. The non-transitory, computer-readable storage medium of claim 13, wherein the computer executable instructions are further configured for:
processing the persistent session cookie to determine when a session last occurred prior to determining whether the user module should be assessed for security vulnerabilities.

16. The non-transitory, computer-readable storage medium of claim 13, wherein:
redirecting the user module comprises a transparent traffic routing approach, the transparent traffic routing approach comprising at least one of a Generic Routing Encapsulation (GRE) traffic routing approach, an Internet Protocol Security (IPSec) traffic routing approach, a Layer 3 (L3) traffic interception traffic routing approach, and a proxy auto-config (PAC) file traffic routing approach.

17. The non-transitory, computer-readable storage medium of claim 13, wherein the computer executable instructions are further configured for:
updating the persistent session cookie to reflect that no security vulnerabilities were detected when the assessment of the user module to detect possible security vulnerabilities does not detect any possible security vulnerabilities.

18. The non-transitory, computer-readable storage medium of claim 13, wherein:
the persistent session cookie is implemented to contain certain session information, the session information including at least one of information related to the user module, an associated user module endpoint device, a user associated with the user module, temporal information related to the user module, user behavior information associated with a session, and contextual information associated with the session.

19. The non-transitory, computer-readable storage medium of claim 13, wherein the computer executable instructions are deployable to a client system from a server system at a remote location.

20. The non-transitory, computer-readable storage medium of claim 13, wherein the computer executable instructions are provided by a service provider to a user on an on-demand basis.

* * * * *